United States Patent
Peeters et al.

(10) Patent No.: US 6,561,935 B2
(45) Date of Patent: May 13, 2003

(54) FORAGE BOX CLUTCH MECHANISM

(75) Inventors: Kenneth J. Peeters, Bear Creek, WI (US); Arthur G. Erdman, New Brighton, MN (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 09/779,684

(22) Filed: Feb. 8, 2001

(65) Prior Publication Data

US 2001/0051553 A1 Dec. 13, 2001

Related U.S. Application Data

(63) Continuation of application No. 08/780,379, filed on Jan. 8, 1997, now Pat. No. 6,224,506, which is a continuation-in-part of application No. 08/252,962, filed on Jun. 2, 1994, now abandoned, which is a continuation-in-part of application No. 08/163,391, filed on Dec. 9, 1993, now abandoned.

(51) Int. Cl.[7] .............................................. F16H 59/00
(52) U.S. Cl. ..................................................... 474/37
(58) Field of Search ................................ 474/28, 30, 37, 474/49, 50, 128

(56) References Cited

U.S. PATENT DOCUMENTS

| | | | |
|---|---|---|---|
| 258,242 A | 5/1882 | Merritt | 474/119 |
| 1,188,810 A | 6/1916 | Mitchell | 474/119 |
| 2,000,593 A | 5/1935 | Happel | 474/37 |
| 2,257,744 A | 10/1941 | Heyer | 116/DIG. 4 |
| 2,504,624 A | 4/1950 | Barnes | 74/242.9 |
| 2,603,979 A | 7/1952 | du Pont | 74/242.5 |
| 3,360,999 A | 1/1968 | Mullet | 180/6.66 |
| 3,608,386 A | 9/1971 | Pambid | 74/230.17 |
| 3,743,043 A | 7/1973 | Gelinas | 180/6.2 |
| 4,196,859 A | 4/1980 | Trott | 239/677 |
| 4,674,994 A | 6/1987 | Tomiyori | 474/24 |
| 5,298,000 A | 3/1994 | Rattunde | 474/24 |

FOREIGN PATENT DOCUMENTS

| | | |
|---|---|---|
| AU | 492682 | 7/1977 |
| GB | 2037913 | 11/1979 |
| IT | 428018 | 2/1947 |
| JP | 1-87957 | 4/1989 |
| JP | 3-129170 | 6/1991 |
| JP | 5-18448 | 1/1993 |
| JP | 6-94125 | 4/1994 |
| SU | 745418 | 7/1980 |

*Primary Examiner*—David A. Bucci
*Assistant Examiner*—Vicky A. Johnson
(74) *Attorney, Agent, or Firm*—Patterson, Thuente, Skaar & Christensen, P.A.

(57) ABSTRACT

The present invention is a control apparatus for an implement transmission. The transmission is operably coupled to a plurality of driven mechanisms for providing a driving power from a prime mover to the plurality of driven mechanisms. A shift assembly has a first and a second actuator apparatus. The first actuator apparatus is operably coupled to the transmission for selectively controlling the transmission of a driving power to at least a first driven mechanism, and the second actuator apparatus is operably coupled to the transmission for selectively controlling the transmission of a driving power to at least a second driven mechanism. The second actuator apparatus has a biasing apparatus for exerting a variable, selective bias on the transmission. A clutch for selectively engaging and disengaging a prime mover and the transmission has a rotatable stop member and an idler-stop assembly. The idler-stop assembly is shiftable between an engaged disposition and a disengaged disposition wherein the clutch is engaged and disengaged. The idler-stop assembly has a stop engaging member, the stop engaging member intersecting a path of rotation of the stop member to engage the stop member when in the disengaged disposition, said stop engaging member thereby positively disengaging the prime mover from the transmission. The clutch further includes an emergency stop assembly for remotely disengaging the driven sheave assembly.

4 Claims, 13 Drawing Sheets

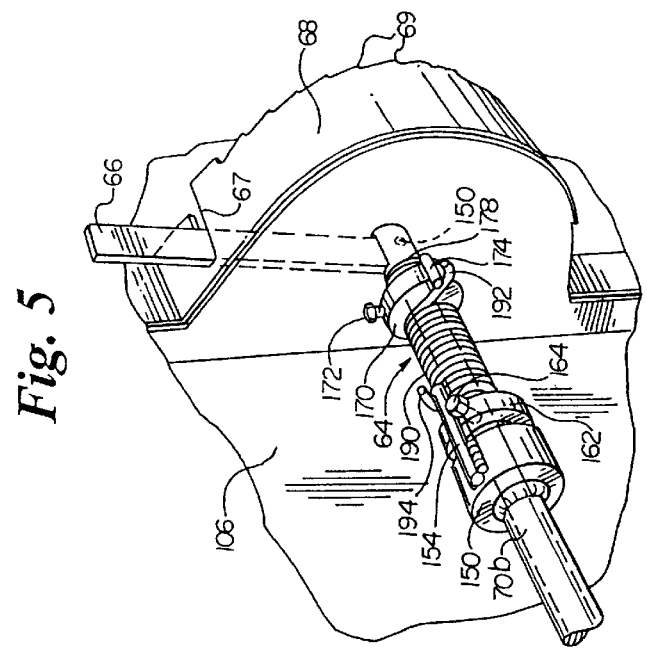

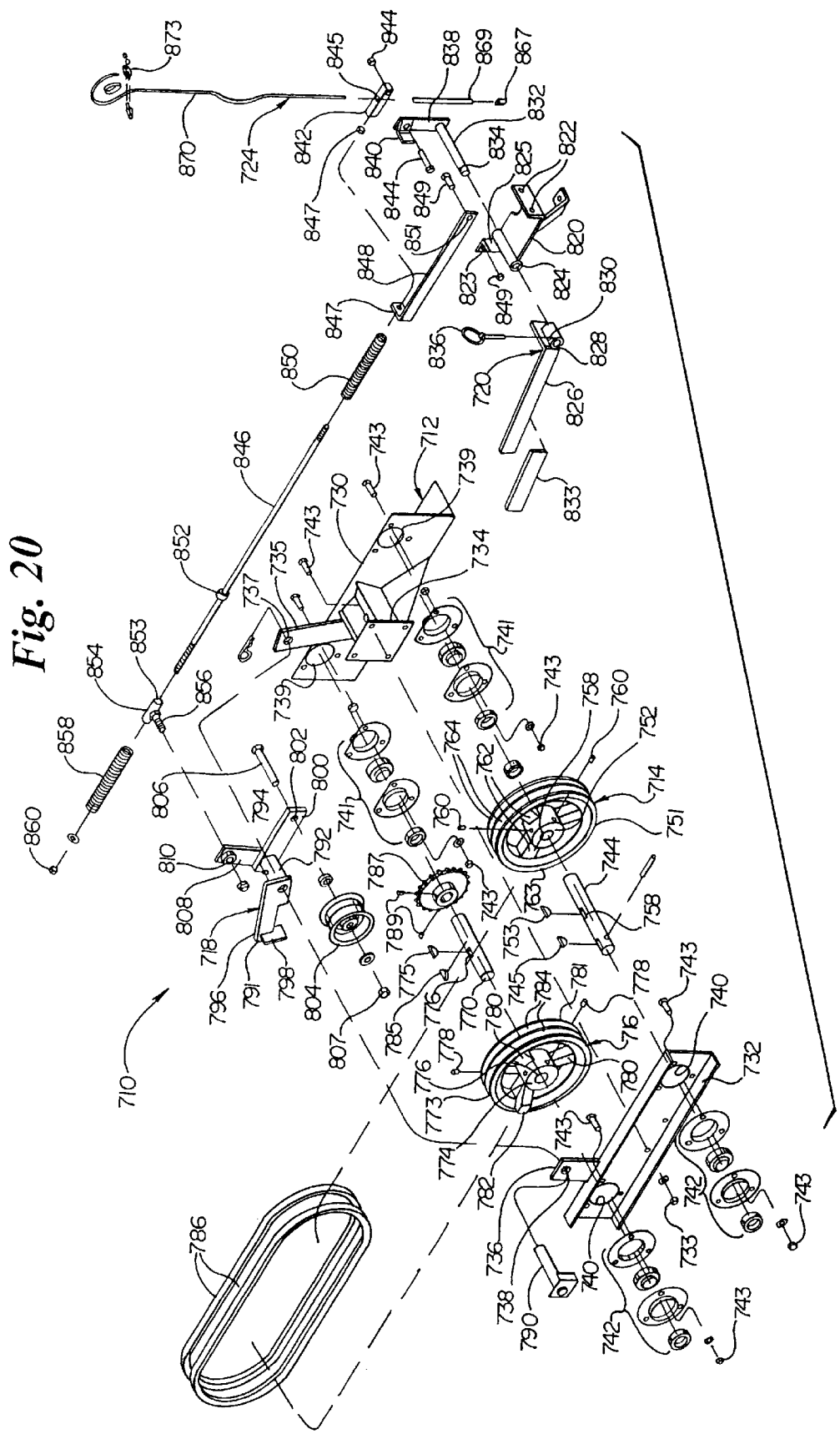

FORAGE BOX CLUTCH MECHANISM

RELATED APPLICATIONS

The present application is a continuation of application Ser. No. 08/780,379 filed Jan. 8, 1997, now U.S. Pat. No. 6,224,506, which is a continuation-in-part of U.S. patent application Ser. No. 08/252,962, filed Jun. 2, 1994 now abandoned, which application is a continuation-in-part of application Ser. No. 08/163,391, filed Dec. 9, 1993, now abandoned.

TECHNICAL FIELD

The present invention relates to a clutch and a shift assembly. More particularly, the present invention relates to a clutch having a driving sheave powering a driven sheave by means of a belt and a shift assembly having first and second actuators, the actuators configuring a transmission for delivering rotational power to a plurality of driven mechanisms.

BACKGROUND OF THE INVENTION

While the present invention is described with particularity as related to forage boxes, it is understood that the present invention has application in numerous other applications requiring coupling a prime mover to a driven mechanism. There are many such applications, particularly in the field of agricultural implements where the prime mover is a tractor driven power takeoff and the driven mechanism is on an implement that is separate from, but powered by the tractor.

Forage boxes are typically towed behind a tractor and are utilized to transport livestock feed from a field where the feed is grown and harvested to a site where the feed is either stored or provided to livestock for consumption.

The forage box typically has a plurality of different mechanisms for unloading the food product that is being transported in the forage box. The first such mechanism is a cross conveyor or auger that operates laterally with respect to the longitudinal axis of the forage box to discharge food product from an opening located in a side of the forage box proximate the front end thereof. Rotating beaters are located generally above the cross conveyor to direct the food product onto the cross conveyor. Additionally, aprons, which are chain-drawn bars that are pulled along the floor of the forage box from the rear to the front of the forage box act to bring the food product forward for interaction with the beaters and cross conveyor. The forage box preferably utilized with the present invention incorporates a separate lever for both engaging the rotatable beaters and for selecting the speed of the aprons.

The unloading mechanisms of the forage box are typically powered by connection to the power take off (PTO) of a farm tractor. The PTO rotates at a selected speed and imparts rotational motion to the unload mechanisms of the forage box through a transmission. A clutch mechanism may be incorporated between the PTO and the transmission of the unload mechanisms in order to provide control of the unload mechanisms from the front of the forage box without recourse to starting and stopping the PTO at the tractor controls.

The clutches utilized on forage boxes and many other implements typically have two sheaves. The driving sheave imparts rotational motion to the driven sheave by means of multiple belts. Clutch engagement and disengagement is controlled by an idler pulley that increases or decreases tension on the plurality of belts as desired. A problem that occurs with current implement clutches is that when the sheaves get rusty during storage or if belt dressing has been used to increase belt traction, the belts do not immediately disengage from the sheaves when the pressure of the idler pulley is removed form the belts. This results in the driven mechanisms, such as the beaters of the forage box, continuing to run on after disengagement has been commanded. The clutch is typically covered by a shield. The shield then has to be removed to free the belts, exposing the operator to the still rotating clutch components. The PTO should also be disengaged before attempting to free the belts. Having to take such actions can be dangerous, time-consuming, and frustrating for the operator.

A related problem is the need for an emergency stop function that will immediately disengage the implement clutch from the PTO and immediately stop the driven mechanisms. The emergency stop function is needed to ensure the safety of operators of the implement. For example, in the event that an operator's clothing or the like becomes caught up in one of the unload mechanisms of a forage box, there is a need to immediately stop the unload mechanisms in order to prevent injury or death to the operator. Accordingly, a clutch that runs on after disengagement of the idler pulley contributes to an emergency situation.

The better forage boxes have provided a mechanism to vary the speed of the aprons so that the speed of delivery of the feed to the auger or blowers that inject the feed into the silo can be changed. Changing the apron speed accommodates the varying rates at which the feed can be conveyed into the silo. The variation in speed is typically achieved through the transmission. Although many types of transmissions can be successfully employed, the transmission usually has a variable speed drive commonly called a variable speed sheave. The sheave system consists of two rotating sheaves spaced apart and connected by an endless rubber belt. Each of the two sheaves has a fixed disc and a movable disc that together form the sheave. The interior face of each disc is angled inward toward the center axial shaft of the sheave. Taken together, the two angled discs form a V-shaped groove with the apex of the V at the center shaft. Varying the spread of the V effectively varies the diameter of the sheave that the belt rides in.

The movable disc is capable of moving laterally with respect to the fixed disc on the common axial shaft such that the movable disc is positionable either very close to the fixed disc or the movable disc can be moved apart from the fixed half. Varying the distance apart of the two discs effectively changes the spread of the V and the resulting diameter of the sheave over which the belt rides. Since the belt is fixed in length, it can be seen that as the movable disc of one of the sheaves moves closer to the fixed disc, the movable disc of the second sheave must move further apart from the fixed portion, thereby decreasing the effective diameter on the second sheave. The two sheaves then function as two gears of variable gear ratio to provide the variable drive speeds for the aprons.

One of the two sheaves, the driven sheave, is driven by the power takeoff (PTO) unit from a tractor through the clutch. When engaged, the clutch supplies power from the PTO to the augers. The driven sheave directly powers the beaters at a constant speed with respect to the speed of the PTO. The second of the two sheaves, the slave sheave, is connected to the aprons in the bed of the forage box. As the two sheave discs of the driven sheave are brought closer together the rotational speed that is imparted to the slave sheave is increased proportionally as a function of the fact that the rotational speed of the driven disc remains constant as determined by the speed of the PTO, while the effective diameter of the driven sheave groove in which the belt rides is increased. This increases the rotational and lineal speeds of the belt. At the same time as the diameter of the driven sheave is increasing, the diameter of the slave sheave is decreasing. The increased speed of the belt and the decreased diameter of the slave sheave results in the slave sheave being driven at a greater rotational speed, in turn resulting in a greater speed being imparted to the aprons.

A shifting mechanism has been provided in the past so that operator of the forage box can engage the feed delivery mechanisms and select the speed of the aprons as desired. These selections were effectively limited only to times when the PTO was engaged. The shift assembly was a bar manually rotated by the operator acting through a lever-like handle affixed to one end of the bar. Through a number of engaging mechanisms, the shift assembly directly controlled the distance of the movable disc of the driven sheave from the fixed disc of the driven sheave and thereby controlled the gear ratio of the variable speed sheave. To achieve a higher speed of the aprons, the shift assembly was rotated to bring the movable disc of the driven sheave closer to the fixed disc of the driven sheave. Conversely, reduced apron speed was achieved by moving the movable disc further from the fixed disc, thereby reducing the effective diameter of the driven sheave.

Removing crops from the field is a time sensitive operation. The window of opportunity for harvesting the crops is frequently determined by nature and is often very time-compressed. Weather conditions will dictate whether the field is accessible to equipment, and will also effect the water content of the crop to be harvested. Once the window of opportunity opens, long hours are required in the field that often extend through the night. A number of forage box loads from the field are required to remove a single day's or night's harvesting efforts. A breakdown of the forage box can have disastrous results, in that the entire harvesting operation may have to be halted while repairs are effected. Such work stoppages can be very costly and exceedingly frustrating for the operator.

The direct connection between the operator's lever and the movable disc of the driven sheave has been a source of breakdowns as indicated above. With the PTO unit from the tractor engaged and with all the feed delivering mechanisms already operating, shifting to a higher or lower apron speed generally presented no problem. This was especially true if the change from one speed to another was done gradually, that is, the rotation of the shift assembly was not abruptly made by the operator. Gradually changing the apron speed gave the driven sheave time to relatively slowly either compress or expand, thereby permitting the belt to ride either further up or down without binding as the belt rotates within the sheave through a number of revolutions.

The most serious problems have occurred in the selection of a higher speed when the PTO unit is disengaged, either by not being powered by the tractor or when the intervening clutch is disengaged and the PTO shaft is rotating. In this condition, the feed delivering mechanisms are not rotating at all. The transmission belt is stationary within the non-rotating sheaves in the position of the speed at which the feed delivery mechanisms were running when the forage box was last powered down.

The operator will tend to exert a great deal of pressure on the lever of the shifting mechanism in order to preselect a higher speed when the PTO is later engaged, resulting in the compression of the belt firmly within the two discs of the driven sheave. When the PTO is then engaged to the transmission, the belt will remain pinched within the driven sheave. The belt accordingly buckles under the driven sheave and effectively tries to wrap itself twice around the driven sheave. The belt will separate because of the tremendous forces exerted by the PTO. Alternatively, the belt may be cut by the supporting flanges beneath the driven sheave as the pinched belt is pulled under the driven sheave. In either case, the belt will be severed and the forage box apron mechanisms will cease to operate. Time-consuming repairs are required to replace severed belts.

Belts can also sever when a high apron speed is rapidly and forcefully selected with the feed mechanisms operating at a low speed. The operator's brusk, forceful rotation of the operator's lever can immediately capture the belt and wrap it beneath the driven sheave, where it is subject to being torn as indicated above.

What is needed is a forage box in which the speed of the aprons can be safely and reliably preselected while the PTO unit is disengaged from the forage box, and that is immune from damage when a higher speed is selected from a lower speed in a brusk manner. A simple and reliable preselection mechanism should be included that can function with the existing drive mechanism for the various feed delivering mechanisms. The preselector should be of the type that is easily understood and actuated by the operator of the forage box. Such a shift mechanism should not include the addition of complex hydraulic or electric actuators that will entail their own maintenance problems. A simple, reliable mechanical device is much preferable.

There is also a need in the industry for a clutch that can be used with a forage box or other implement that stops virtually immediately upon command and for a safety mechanism to provide an emergency stop command to the clutch from a number of positions proximate the implement, but remote from the clutch.

SUMMARY OF THE INVENTION

The forage box shift mechanism in accordance with the present invention provides for the speed of the various feed delivering mechanisms in the forage box to be preselected prior to engagement of the power takeoff unit of the tractor. Additionally, the shift mechanism of the present invention isolates the variable speed sheave from any brusk speed selections of a high apron speed by the operator. The operation of the shift mechanism hereof is designed to be easily understood by the operator as well as being easy to use and to be maintenance free. To the operator, the physical actions required to make a preselection and speed shift of the indirect shift mechanism of the present invention are virtually unchanged from the physical actions required to operate conventional direct shift mechanisms. The mechanism in accordance with the invention, however, functions significantly different from prior mechanisms so as to guard against belt failure.

The shift mechanism of the present invention has four major components: an inner bar actuator, an outer cylindrical actuator, an outer actuator sleeve, and a coil spring. The inner bar actuator provides actuation to the augers and beaters. The inner bar actuator is concentric with and disposed within both the outer cylindrical actuator and the outer actuator sleeve. The outer cylindrical actuator is joined at a first end to the crank mechanism that positions the movable disc of the driven sheave. The outer actuator sleeve is mounted coaxial with the outer cylindrical actuator at the second end of the outer bar actuator. The actuator sleeve is free to rotate about its longitudinal axis independent of the outer bar actuator. The actuator sleeve is coupled to the lever with which the operator of the forage box selects the desired speed of the apron mechanisms that deliver the feed. The coil spring joins the outer bar actuator to the actuator sleeve such that rotation of the actuator sleeve with respect to the outer cylindrical actuator either increases or decreases the tension in the coil spring.

In operation, the operator of the forage box preselects a speed for the aprons that is either greater or lesser than the speed of the aprons that was selected at the time the forage box was last powered down. When the operator selects a greater speed, a greater tension is supplied to the coil spring. Conversely, when the operator selects a lesser speed, a lesser tension is imparted to the coil spring. The operator's preselection affects only the tension in the coil spring. No movement of the crank mechanism between the first end of the outer bar actuator and the movable disc of the driven sheave is made. When, for example, the operator selects a greater speed, the increased tension in the coil spring will exert a rotational force on the outer cylindrical actuator, which in turn exerts a force on the movable portion of the driven sheave when the PTO is engaged. As the variable speed sheave rotates, the increased force gradually drives the movable disc of the driven sheave toward the fixed disc of the driven sheave. This motion gradually increases the effective diameter of the sheave that is presented to the belt. Due to the gradual nature of the change, the belt will, over the period of several revolutions, slowly move outward as the greater diameter of the driven sheave is achieved.

The force exerted by the coil spring is deliberately selected so that it does not exert a great enough force on the movable disc of the driven sheave to pinch or capture the belt between the two discs of the driven sheave. The forage box shift mechanism in accordance with the present invention provides for the speed of the various feed delivering mechanisms in the forage box to be preselected prior to engagement of the power takeoff unit of the tractor. Additionally, the shift mechanism of the present invention isolates the variable speed sheave from any brusk speed selections of a high apron speed by the operator.

The clutch of the present invention provides a number of distinct advantages. When used on the preferred forage box, the clutch of the present invention allows just the cross conveyor (the augers) to be activated for unloading the forage box, without activating the beaters or the aprons. With the clutch engaged and the cross conveyor operating, momentary actuation of the operator's lever of the shift mechanism by pulling the lever to the operator's right momentarily rotationally activates the beaters. Release of the operator's lever stops the beaters, as the operator's lever is biased to the disengaged position. Further, with the clutch engaged and the cross conveyor operating, the operator's lever of the shift mechanism can be further activated to rotationally engage the beaters and to select between twelve variable speeds for the aprons.

Additionally, the clutch of the present invention substantially meets the aforementioned needs by providing a positive stop on the driven sheave that immediately disengages the belts from the sheaves, even if the sheaves are rusty or belt dressing has been used on the belts to increase traction or the belts have been operating under very heavy load. Further, a safety mechanism is provided to enable an emergency disengagement of the clutch from a plurality of locations proximate the front of the forage box where an operator is likely to be positioned. The safety mechanism is readily adaptable to other implements, as well.

The present invention is a control apparatus for an implement transmission. The transmission is operably coupled to a plurality of driven mechanisms for providing a driving power from a prime mover to the plurality of driven mechanisms. A shift assembly has a first and a second actuator apparatus. The first actuator apparatus is operably coupled to the transmission for selectively controlling the transmission of a driving power to at least a first driven mechanism, and the second actuator apparatus is operably coupled to the transmission for selectively controlling the transmission of a driving power to at least a second driven mechanism. The second actuator apparatus has a biasing apparatus for exerting a variable, selective bias on the on the transmission. A clutch for selectively engaging and disengaging a prime mover and the transmission has a rotatable stop member and an idler-stop assembly. The idler-stop assembly is shiftable between an engaged disposition and a disengaged disposition wherein the clutch is engaged and disengaged. The idler-stop assembly has a stop engaging member, the stop engaging member intersecting a path of rotation of the stop member to engage the stop member when in the disengaged disposition, said stop engaging member thereby positively disengaging the prime mover from the transmission. The clutch further includes an emergency stop assembly for remotely disengaging the driven sheave assembly.

BRIEF DESCRIPTION OF THE DRAWINGS

FIG. 2 is a right front quarter perspective of the drive mechanism with the protective shields removed and a portion of the clutch actuator handle broken away to better show the shift assembly and the clutch;

FIG. 5 is a perspective view of the speed selector and the speed quadrant of the shift mechanism;

FIG. 20 is an exploded perspective view of the clutch of the present invention.

DETAILED DESCRIPTION OF THE DRAWINGS

Figure 1:
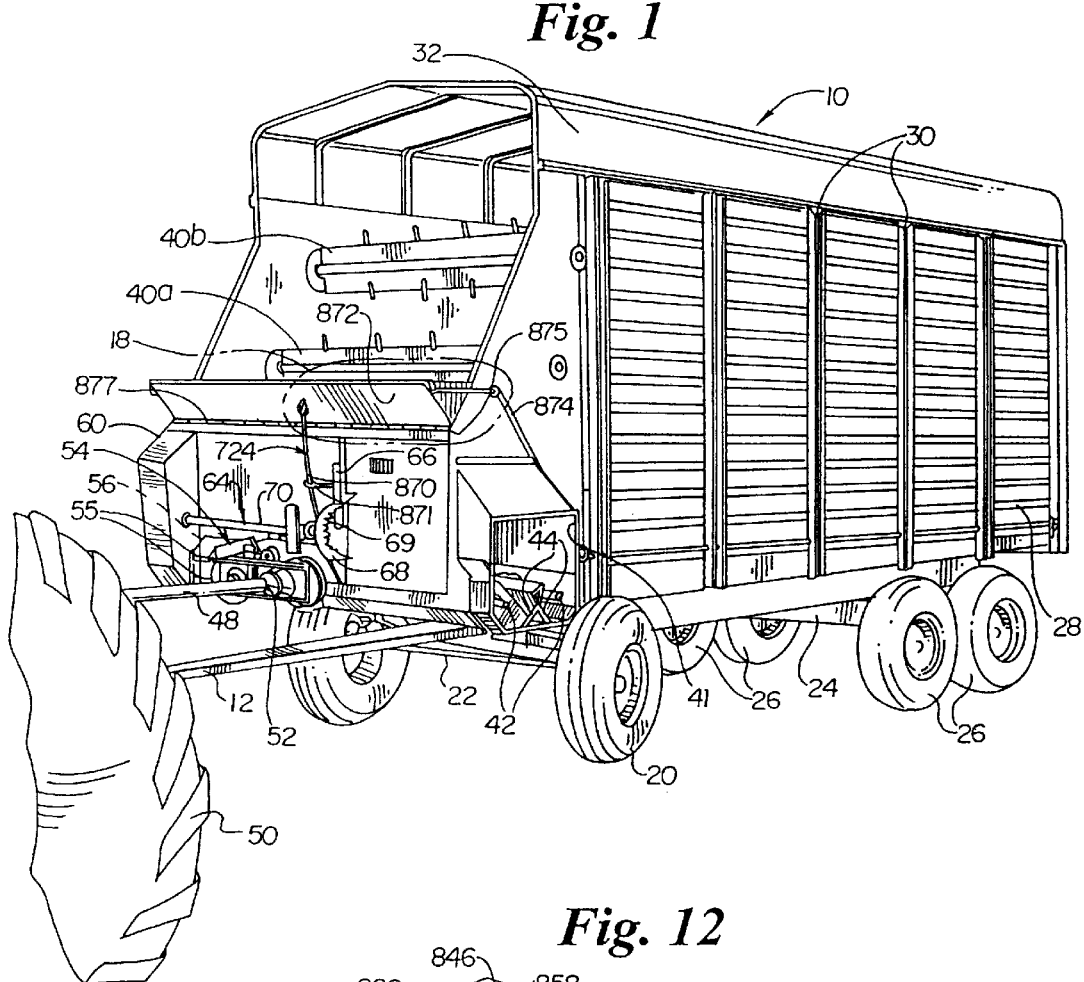
FIG. 1 is a left front quarter perspective of a forage box with the clutch and shift assembly in accordance with the present invention mounted on the exterior of the front wall.

A forage box is depicted generally in FIG. 1 at 10. Forage box 10 has a tongue 12 designed to be pulled by a tractor or a truck. Tongue 12 is connected to front axle 14. Front axle 14 is fixed beneath frame 18, supporting the front portion of frame 18. Front axle 14 has front wheels 20 pivotally mounted at either end. Front wheels 20 are steerable by being pivoted and the direction of travel is controlled by tongue 12 via tierods 22. Tierods 22 are affixed at a first end to tongue 12 and at a second end to the respective front wheel 20.

The rear portion of frame 18 is supported by rear axles 24. Rear axles 24 have rear wheels 26 mounted at either end. Rear axles 24 are affixed beneath frame 18. Frame 18 supports a bed (not shown). The bed provides a substantially enclosed bottom of forage box 10. In a preferred embodiment, the bed is substantially constructed of wooden members. Upwardly tending sides 28 are affixed to the sides of the bed and are supported by upright supports 30. The left side 28 is shown in FIG. 1. A top 32 is provided in order to keep rain off the feed that is contained within forage box 10.

Forage box 10 contains a number of feed delivery mechanisms that are designed to move the feed in forage box 10 forward for conveyance from forage box 10. The first such feed delivery mechanism is beaters 40. Two of such beaters 40a, 40b are shown in FIG. 1. A third beater 40 (not shown) is disposed beneath the second beater 40a. When viewed from the left hand side of forage box 10, beaters 40 rotate in a counter clockwise manner. Beaters 40 are typically constructed of a series of transverse bars with short spikes or paddles affixed thereto.

The second feed delivery mechanism (not shown) are aprons that ride from the rear to the front of forage box 10 on the bed of forage box 10. Bars, typically formed of angle iron, are affixed to apron chains and are oriented transversely in the bed of forage box 10. The aprons include specially constructed endless chains that are specifically designed to pull the bars forward in the forage box 10. The aprons rotate forward on the upper surface of the bed and return rearward beneath the lower surface of the bed of forage box 10. The speed of such aprons determines the rate at which feed is provided for ejection from the discharge opening 41 at the left front of the forage box 10.

In the embodiment shown, the third feed delivery mechanism is twin augers 42 that rotate within auger troughs 44 and move the feed transversely within the front portion of forage box 10 to eject it from the discharge opening 41. In an alternate embodiment, a relatively small apron unit is utilized operating transverse to the bed to convey the feed from the discharge opening 41 of the forage box 10.

A transmission 46 is provided to transmit power to the various feed delivery mechanisms of forage box 10. Motive force for the transmission 46 is provided by PTO drive shaft 48. PTO drive shaft 48 is shown in FIG. 1 coupled to the power takeoff (PTO) drive shaft 48 of the tractor 50. PTO drive shaft 48 has suitable universal joints 52 to allow it to operate at a wide variety of angles with respect to forage box 10.

Referring to FIGS. 1 and 2, the PTO drive shaft 48 is connected to clutch 54. The clutch 54 controls the rotation of the drive chain 55. The drive chain 55 is enclosed behind shield 56. Drive chain 55 functions to power transmission 46, enclosed behind shield 60. The shields 56, 60 are safety devices to protect the operators of the forage box 10 from rotating machinery. Drive chain 55 and transmission 46 are discussed in more detail hereafter in relation to later figures.

A shift assembly in accordance with the present invention is shown generally at 64. The operator's lever is shown at 66. Operator's lever 66 is depicted in FIG. 2 in the "off" detent 67 of the speed quadrant 68. The first end of operator's lever 66 is designed to be grasped by the operator during actuation. The second end of operator's lever 66 is affixed to shift bar assembly 70. Operator's lever 66 is designed so that an operator standing facing the front of forage box 10 can pull operator's lever 66 to the operator's right, out of the "off" detent 67 in speed quadrant 68, to select actuation of the beaters 40 at a constant speed and then rotate lever 66 downward and forward, toward the operator in order to select the desired apron speed, the beaters 40 remaining actuated.

As depicted in FIG. 5, speed quadrant 68, in the preferred embodiment, is semi-circular in shape having a number of detents therein designed to engage operator's lever 66. Such detents in speed quadrant 68 include the "off" detent 67, in which the aprons and beaters 40 are not powered, and twelve additional detents 69 corresponding to varying speeds of the apron.

Shift bar assembly 70 is a multi-functional actuation device. Accordingly, the shift bar assembly 70 comprises two concentric actuators, the inner bar actuator 70a and the outer cylindrical actuator 70b. Generally, the shift bar assembly 70 is connected at its first end to operator's lever 66. The second end of shift 46 assembly 70 is connected to and controls the operation of the transmission 46 through several different types of connections and methods of actuation.

The transmission 46 is best depicted in FIG. 2. Generally, the various drive mechanisms for the aprons, the beaters 40, and the twin augers 42 are depicted disposed along the right side of the forage box 10. The sheave drive 90 is disposed at the front of the forage box 10. A gear box 71 is disposed between the sheave drive 90 and the various drive mechanisms for the aprons, the beaters 40, and the twin augers 42.

The beater drive of the transmission 46 powers the beaters 40 and is comprised of a series of chains and sprockets shown generally at 74. Beater drive 74 conveys power from the PTO drive shaft to each of the beaters 40. Accordingly, drive sprocket 74a is coupled to the gear box 71 and is powered by the PTO through intervening mechanisms, as will be described. The drive sprocket 74a drives first chain 74b. First chain 74b drives large sprocket 74c and rotates the first beater (not shown). The large sprocket 74c functions as a rotational speed reducer and in turn drives second chain 74d. Second chain 74d rotates second beater sprocket 74e.

Second beater sprocket 74e is affixed to the end of the second beater and, therefore, rotates the second beater 40a. Second beater sprocket 74e also powers third chain 74f. Third chain 74f in turn drives third beater 40b.

Power to beater drive 74 is provided by the gearbox 71 and controlled by forked clutch mechanism 76. The forked clutch mechanism 76 is engaged or disengaged as desired by fork 78. The first end of fork 78 is pivotally affixed to the forked clutch mechanism 76. The second end of fork 78 is coupled to the inner bar actuator 70a of the shift bar assembly 70. Fork 78 is pivotally mounted at mount 80 to structure of forage box 10. Fork 78 pivots about mount 80 such that transverse motion of the inner bar actuator 70a in one direction produces transverse motion of the clutch 76 in the opposite direction.

The augers 42 are powered by auger transmission shown generally at 84. Auger drive train 84 comprises sprockets 84a affixed to the end of the respective auger shafts 86. Sprockets 84a are powered by chain 84b that runs around both sprockets 84a and is kept in tension by idler 84c. Like the beaters 40, power to the augers 42 is provided by the gearbox 71. The gear box 71 is rotationally coupled to the frontmost auger shaft 86 of the twin augers 42. Driving that auger shaft 86 drives the frontmost twin auger 42 directly and the rearmost twin auger 42 by means of the auger drive train 84. The gear box 71 is so mechanized that any time that the drive chain 55 is in motion, the twin augers 42 are actuated without any other control.

The apron drive train is shown generally at 88. Drive sprocket 88a powers apron sprocket 88b by a chain 88c. Chain 88c is kept in tension by guide 88d.

Apron sprocket 88b is affixed to the end of a rotating transverse bar (not shown). The rotating transverse bar has four sprockets attached thereto at intervals across the width of the bed of forage box 10. Each such sprocket is engaged with the links of an apron chain (not shown) and rotation of the bar draws the apron chains from the rear of the forage box 10 to the front of forage box 10 across the upper surface of the bed of the forage box 10. A series of angle irons (not shown) are affixed to the apron chains and oriented transverse to the longitudinal axis of the bed of forage box 10. One side of each of the angle irons projects upward into the feed in forage box 10 in order to carry the feed to the front portion of forage box 10.

Power is provided to the gear box 71 for actuation of the apron drive train 88 by variable speed sheave drive 90. An extension of axial shaft 92 of driven sheave 94 powers the gearbox, indicated above, that powers beater drive 74 and auger transmission 84. Apron drive train 88 is powered by a worm gear (not shown) disposed in the gear box 71. The worm gear is driven by an extension of central axis 96 of slave sheave 98, as will be described.

Sheave drive 90 is powered by drive chain 55, shown partially in phantom behind shield 56 in FIG. 2, and driven by clutch 54. Drive chain 55 rides over idler sprocket 100 and transmits its power to sheave drive 90 via sprocket 102, best depicted in FIG. 3. Still referring to FIG. 3, sheave drive 90 is supported by flange 104 bolted to front wall of 106 of forage box 10. Both sheaves 94, 98 have respective central axis shafts 92, 96 that project through front wall 106 and are rotatably supported by bearing housings 108. Driven sheave 94 includes the sprocket 102 disposed between driven sheave 94 and bearing housing 108. Sprocket 102 is pinned to the central axis shaft 92 and transmits the motion imparted by drive chain 55 to central axis shaft 92.

Driven sheave 94 is made up of two disks, fixed disk 110 and movable disk 112. Fixed disk 110 is firmly pinned to central axis shaft 92, while movable disk 112 is free to translate in and out on central axis shaft 92, such that the axial distance of movable disc 112 from the fixed disc 110 is variable within a fixed range. Fixed disk 110 and movable disk 112 each have an inwardly canted drive face 114, such that taken together the two drive faces 114 comprise a V-shaped groove between fixed disk 110 and movable disk 112 with the apex of the V at central axis shaft 92. The spread of the V-shaped groove is capable of being varied as movable disk 112 is brought closer to or more distant from fixed disk 110 along the central axis shaft 92. Driven sheave 94 powered by drive chain 55, acting through sprocket 102 and central axis shaft 92.

Slave sheave 98 is of similar construction as driven sheave 94. Slave sheave 98 has a fixed disk 110a, a movable disk 112a and drive faces 114a. Movable disk 112a is biased against fixed disk 110a to the position of greatest effective diameter of slave sheave 98. This biasing is caused by coil spring 116 that is compressively mounted concentric with central axis shaft 96, with one end of coil spring 116 abutting bearing housing 108 and the other end of coil spring 116 engaged with movable disk 112a. To decrease the effective diameter of slave sheave 98, the biasing force of spring 116 must be overcome. Slave sheave 98 is powered by driven sheave 94 acting through drive belt 118.

Drive belt 118 rides in the V-shaped grooves formed in driven sheave 94 and slave sheave 98. Drive belt 118 transmits the rotational power from driven sheave 94 to slave sheave 98. Drive belt 118 is a V-shaped elastomeric endless belt of fixed length. The inward sloping sides of drive belt 118 are cut to match the inward sloping sides of drive faces 114, 114a respectively.

Lever arm 120 is joined at a first end to movable disk 112 at rotatable disk joint 122. Lever arm 120 is joined at its second end to crank arm 124 at rotatable crank joint 126. At a point between its first end and its second end, lever arm 120 is rotatably affixed to flange 104 at rotatable pivot joint 128.

Crank arm 124 is joined at its first end by threaded engagement with sleeve 130 to lever arm 120. Crank arm 124 is joined at its second end by pin 132 to crank chain 134. Crank chain 134 is joined at its second end to the exterior of shift bar assembly 70 by weldment 136. Rotational motion of shift bar assembly 70 is translated into lineal motion by crank arm 124.

Figure 3:
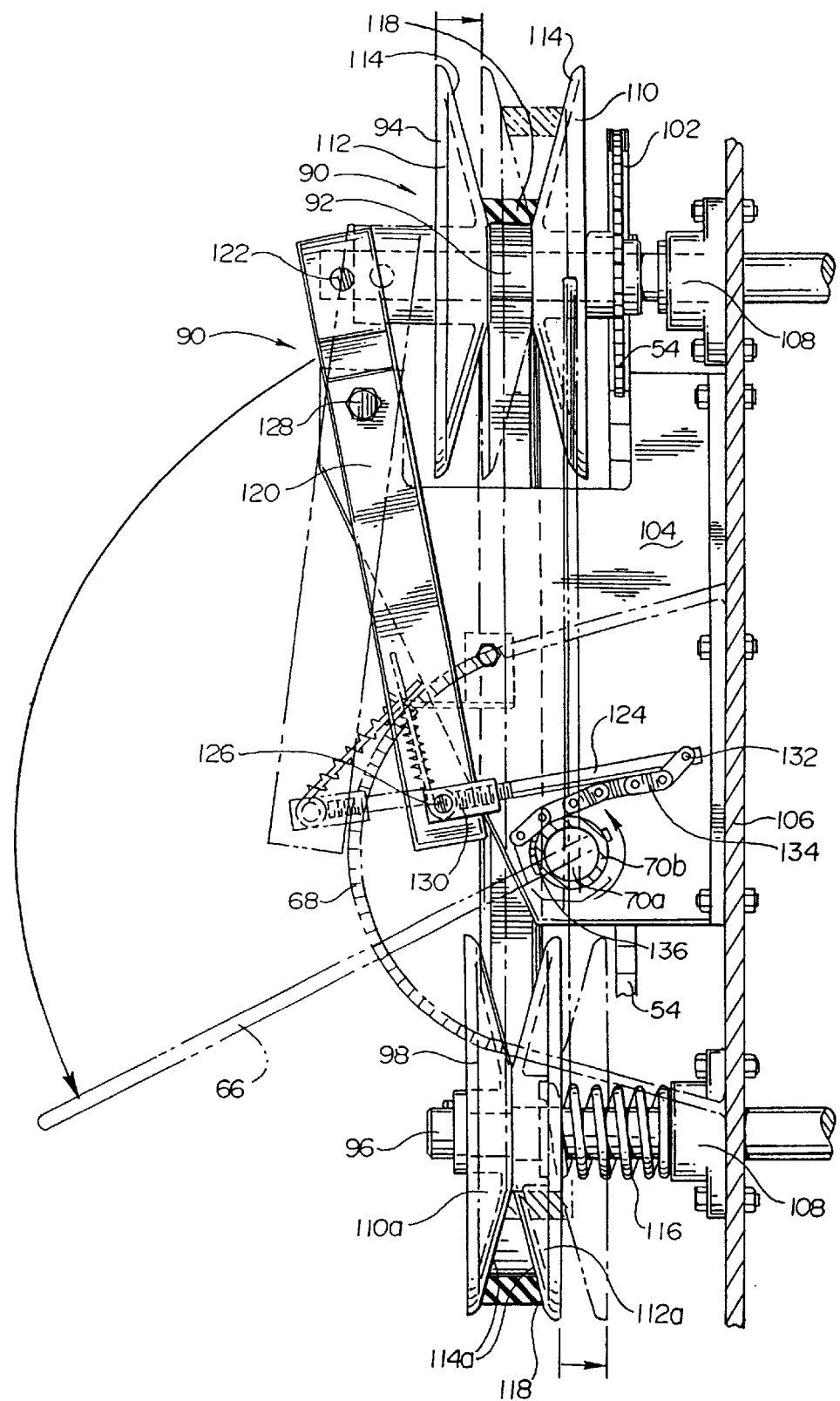
FIG. 3 is an elevational view of the variable speed sheave drive in the low speed configuration with the high speed configuration shown in phantom.

As previously indicated, sheave drive 90 is a variable speed drive. The solid line depiction of the sheave drive 90 in FIG. 3 depicts sheave drive 90 in its low speed configuration. The configuration depicted in phantom shows the high speed configuration of sheave drive 90. The varying effective diameters of the sheaves 94, 98 are evident. The greater the effective diameter of driven sheave 94, the greater the lineal speed of drive belt 118. The greater the effective diameter of driven sheave 94, the smaller the effective diameter of slave sheave 98. Both of these factors contribute to a greater rotational speed of slave sheave 98. Sheave drive 90 is biased in the lowest speed configuration by spring 116.

Figure 4A:
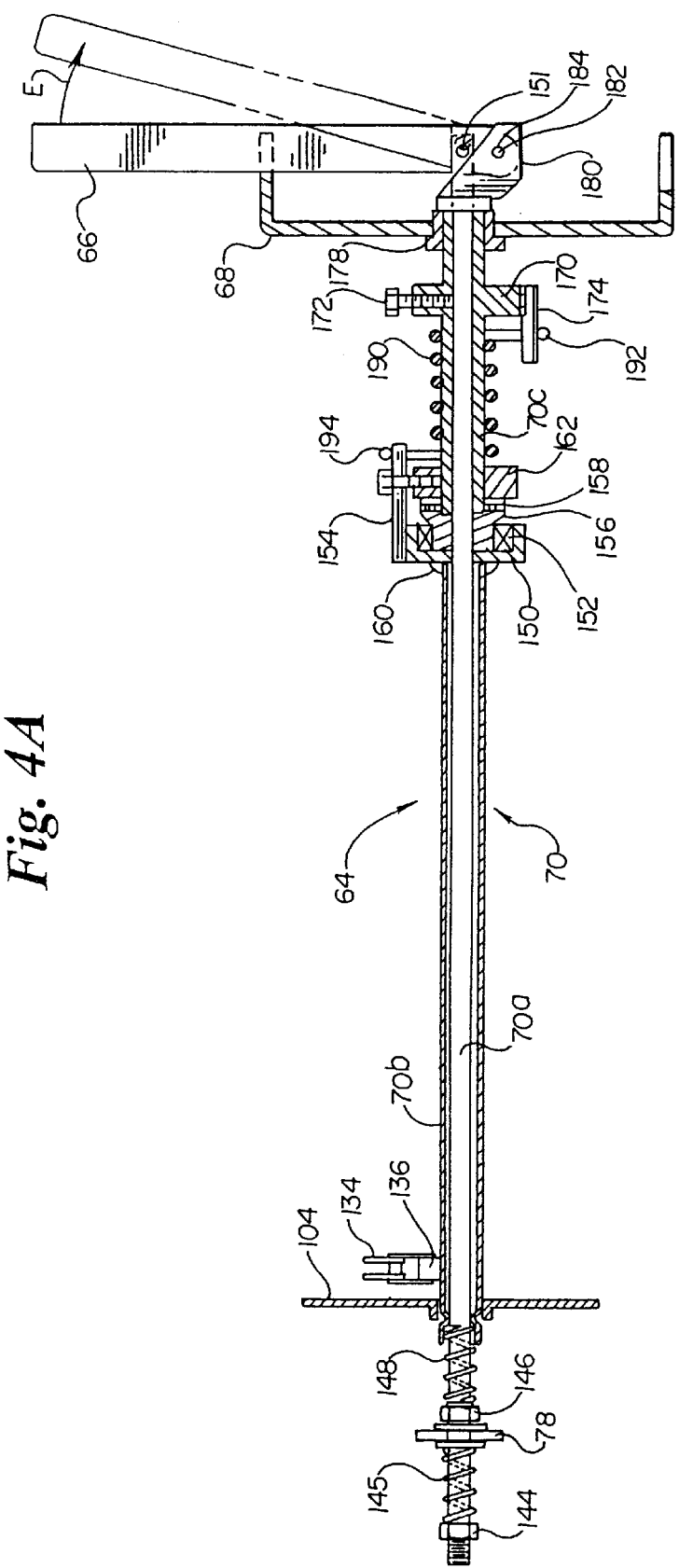
FIG. 4A is a sectional view of the shift mechanism with the operator's lever shown in the off detent and the operator's lever shown in phantom selected out of the off detent.
Figure 4B:
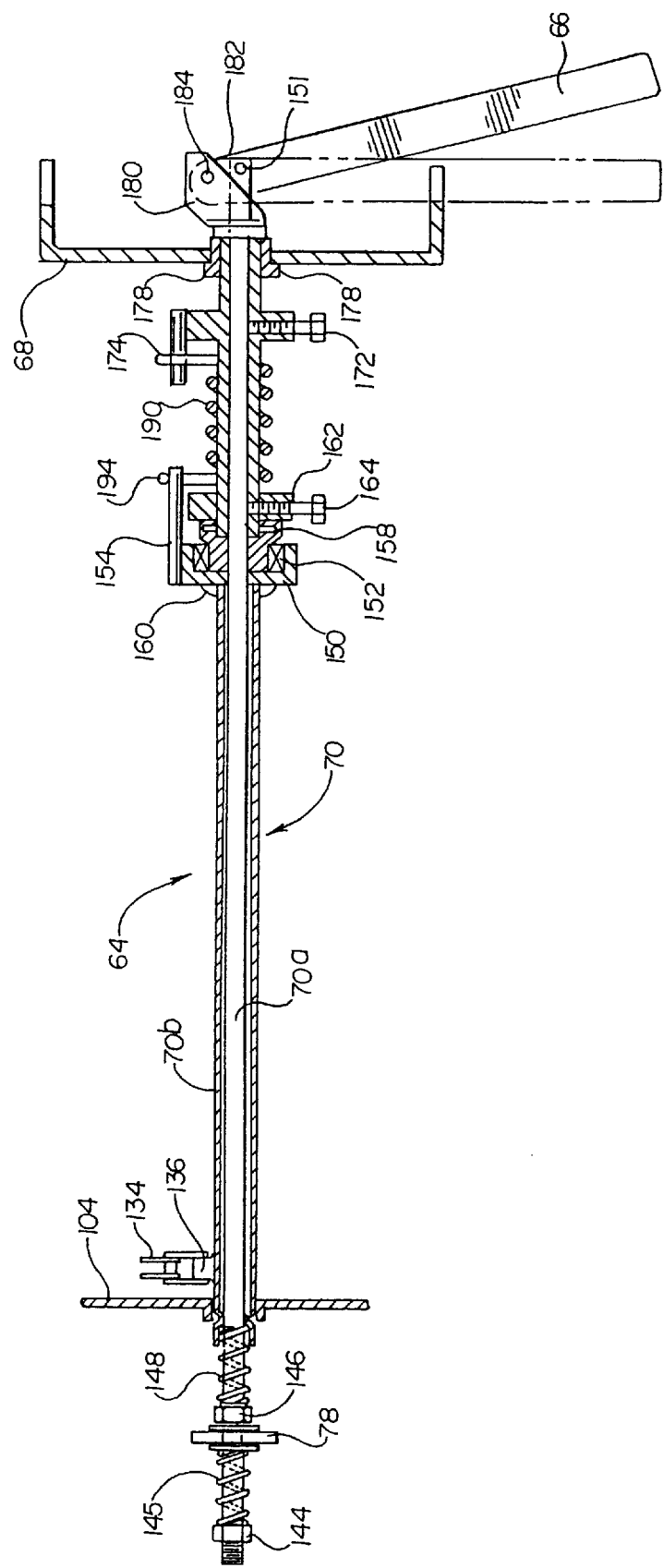
FIG. 4B is a sectional view of the shift mechanism with the operator's lever shown rotated to a high speed selection with the operator's lever shown in phantom selected into a high speed detent.

Details of the construction of shift assembly 64 are best shown in FIGS. 4a and 4b. Shift bar assembly 70 is a concentric bar that is structurally, rotatably supported at two different points. It is supported by sidewall 104 of forage box 10 adjacent to a first end of shift bar assembly 70. At a second end of shift bar assembly 70, support is provided by speed quadrant 68.

As previously indicated, shift bar assembly 70 comprises two concentric actuators, the inner bar actuator 70a and the outer cylindrical actuator 70*b*. Inner bar actuator 70*a* is a solid metal bar that is circular in cross section and disposed within outer cylindrical actuator 70*b*. Inner bar actuator 70*a* is free to rotate and translate longitudinally within outer cylindrical actuator 70*b*. A first end of inner bar actuator 70*a* projects through and extends beyond sidewall 104. Inner bar actuator 70*a* is capped at the first end with a threaded nut 144. Nut 144 retains coil spring 145 in compression on inner bar actuator 70*a*. Coil spring 145 acts to urge fork 78 to the right as depicted in FIGS. 4*a* and 4*b*.

Nut 146 retains coil spring 148 between nut 146 and indentations in outer cylindrical actuator 70*b*. Coil spring 148 is retained in compression and acts to urge inner bar actuator 70*a* to the left as viewed in FIGS. 4*a* and 4*b*.

The second end of inner bar actuator 70*a* is rotatably coupled to operator's lever 66 by pin 151. This means of coupling permits operator's lever 66 to rotate about a line normal to the longitudinal axis of inner actuator bar 70*a* during transverse motion of operator's lever 66. Pin 151 extends through a bore in inner bar actuator 70*a* and a like bore through operator's lever 66 that is in registry therewith. Transverse motion of operator's lever 66 causes inner bar actuator 70*a* to translate within outer cylindrical actuator 70*b* as indicated by the arrow E in FIG. 4*a*.

Outer cylindrical actuator 70*b* controls the speed of the apron mechanism in the bed of forage box 10. Outer cylindrical actuator 70*b* is tube-shaped. The inner diameter of outer cylindrical actuator 70*b* is slightly greater that the diameter of inner bar actuator 70*a*. Crank chain 134 is affixed to outer cylindrical actuator 70*b* adjacent to the first end thereof. The second end of outer cylindrical actuator 70*b* terminates in bearing cap 150. Bearing cap 150 is affixed to the second end of outer bar actuator by a weldment. Bearing cap 150 retains bearing 152. Stop 154 is affixed to the external surface of bearing cap 150 also by a weldment. Stop 154 projects to the right of bearing cap 150 as depicted in FIGS. 4*a* and 4*b*.

Actuator sleeve 70*c* comprises a third major element of shift bar assembly 70. Actuator sleeve 70*c* is a cylindrical tube preferably having the same outside and inside diameters as outer cylindrical actuator 70*b*.

Bearing hub 156 is affixed to the outside diameter of actuator sleeve 70*c* at the end of actuator sleeve 70*c* that is closest to bearing cap 150. Bearing hub 156 is affixed to actuator sleeve 70*c* by a series of set screws 158 arrayed around bearing hub 156. Bearing hub 156 tapers down to fit within the inside diameter of bearing 152. Bearing face 160 of bearing hub 156 rotationally rides within bearing 152.

Immediately adjacent to bearing hub 156 is stop ring 162. Stop ring 162 is a ring of solid metal that is slidably engaged with the exterior surface of actuator sleeve 70*c*. Stop ring 162 is held in a desired position with respect to actuator sleeve 70*c* by stop bolt 164. Stop bolt 164 is threadingly engaged with a bore that radially penetrates stop ring 162 such that stop bolt 164 may be brought firmly into engagement with the outside surface of actuator sleeve 70*c*. Stop bolt 164 is selected to be long enough to extend beyond the outside diameter of stop ring 162 to engage stop 154. Accordingly, stop bolt 164 functions as a set screw to affix stop ring 162 to actuator sleeve 70*c* and functions as a stop when in engagement with stop 154 that is affixed to the exterior surface of bearing cap 150.

Spring stop ring 170 is spaced apart from stop ring 162 and, like stop ring 162, is slidably engaged with the exterior surface of actuator sleeve 70*c*. Spring stop ring 170 has a radially, threaded bore that passes from the outside diameter to the inside diameter of spring stop ring 170. Bolt 172 is threaded into the threaded bore and is firmly engaged with the outside surface of actuator sleeve 70*c* to hold spring stop ring 170 in a desired position.

A spring stop 174 is affixed to the exterior surface of spring stop ring 170 by a weldment. Spring stop 174 is a short solid metal rod that projects to the left of spring stop ring 170 as depicted in FIGS. 4*a* and 4*b*.

Actuator sleeve 70*c* projects to the right through a bore in speed quadrant 68. Actuator sleeve 70*c* is supported in such bore by bearing 178.

Flange 180 is affixed to the end of actuator sleeve 72*c* by a weldment. Flange 180 has a bore 182 therethrough that is brought into registry with a like bore at the end of operator's lever 66. A pin 184 that passes through bore 182 in flange 180 and a bore in the end of operator's lever 66 affixes operator's lever 66 to actuator sleeve 70*c*. Rotation of operator's lever 66 across the face of the speed selection detents of speed quadrant 68 results in rotation of both inner actuator bar 70*a* and actuator sleeve 70*c*.

Coil spring 190 is disposed concentric with and exterior to actuator sleeve 70*c*. Coil spring 190 is disposed between stop ring 162 and spring stop ring 170 and exerts counteracting rotational force thereon. As viewed relative to forage box 10, first end 192 of coil spring 190 is curved rearward and engages the forward side of spring stop 174. The second end 194 of coil spring 190 is curved forward to engage the rear side of stop 154. FIG. 4*b* depicts operator's lever 66 rotated forward as compared to the depiction of operators lever 66 in FIG. 4*a* in the "off" detent 67. Such forward rotation acts to simultaneously rotate stop bolt 164. This rotation of spring stop 174 increases the tension in coil spring 190, thereby increasing the rotational force exerted by coil spring 190. The increase of tension in coil spring 190 acts to increase the tension on stop 154, which in turn urges outside actuator bar 70*b* to rotate in a counterclockwise direction as viewed from the left side of forage box 10. Actual rotation of actuator bar 70*b* in response to this urging does not occur until or unless the drive chain 55 is actuated.

Stop bolt 164 functions to maintain a tensional preload in coil spring 190. This is best understood by viewing the end of actuator sleeve 70*c* from the left hand side of forage box 10. Assuming that outer actuator bar 70*b* is held fixed, rotation of actuator sleeve 70*c* in a counterclockwise direction into a speed detent in speed quadrant 68 increases tension in coil spring 190. When outer actuator bar 70*b* is freed, it will tend to be rotated by spring 190 in a counterclockwise direction. Unrestrained, spring 190 would continue to rotate outside actuator 70*b* in a counterclockwise direction until all the tension in spring 190 was released. This is prevented by stop bolt 164. Since actuator sleeve 70*c* is held in a fixed position in speed quadrant 68, spring 190 can rotate outer actuator bar 70*b* only so far as stop 154 comes into contact with stop bolt 164. Stop bolt 164 being in firm engagement with actuator sleeve 70*c*, prevents outer actuator bar 70*b* from rotating any further. By this means, a preset tension is always maintained in coil spring 190 and, absent other restraining forces, coil spring 190 will always rotate outer actuator bars 70*b* until stop 154 is in contact with stop bolt 164. In design, the preload in coil spring 190 is greater than the load of coil spring 116 acting on movable disk 112*a*.

There are three sets of initial operator conditions that will be examined in looking at the operation of shift assembly 64. The initial conditions are first with the drive chain 55 not actuated, second with the drive chain 55 actuated with the operator's lever 66 in the off detent 67 of speed quadrant 68, and third when selecting a high speed from the preexisting low speed on speed quadrant 68 while the drive chain 55 is actuated.

The first condition with the drive chain 55 not actuated and the operator's lever 66 in the "off" detent 67 in speed quadrant 68 is the most critical for operation of speed selection mechanism 64. The operator's actions are, for example, to move the operator's lever 66 to the operator's right as the operator faces the forage box 10. After clearing the "off" detent 67 in speed quadrant 68, the operator will rotate operator's lever 66 forward toward the operator. When viewed from the left hand side of forage box 10, this forward rotation of operator's lever 66 is a rotation in the counterclockwise direction. The operator then will select a high speed detent 69 on speed quadrant 68.

The operator's actions described above effectively accomplish two things. First, by moving operator's lever 66 to the right, inner bar actuator 70a is also moved to the right. This action rotates fork 78 about mount 80 and engages the forked clutch assembly 76. Engaging clutch 76 rotationally engages the beater drive 74 to the drive chain 55. Beater drive 74 will commence operation as soon as the drive chain 55 is actuated. As previously noted, the twin augers 42 are rotationally driven at all times that the drive chain 55 is actuated without any operator action to select such actuation.

The second result of the operator's actions stems from the counterclockwise rotation of operator's lever 66 to select a high speed detent 69 in speed quadrant 68. The rotation of operator's lever 66 carries with it the simultaneous rotation of actuator sleeve 70c. The rotation of actuator sleeve 70c causes the rotation of spring stop 174 and stop bolt 164. Since movable disk 112 of driven sheave 94 is resting on belt 118 as shown in the dark lines of FIG. 3, the counterclockwise rotation of actuator sleeve 70c does not produce any rotation of outer bar actuator 70b. The rotational preload in spring 190 is thereby increased, resulting in an increased side pressure by movable disk 112 on belt 118.

When the drive chain 55 begins to rotate, sprocket 102 in turn rotates. Sprocket 102 rotates central axis shaft 92 of the driven sheave 94. Central axis shaft 92 in turn powers the gear box 71 that powers beater drive 74. Accordingly, the beaters 40 begin to rotate.

Central axis shaft 92 also rotates driven sheave 94. The rotation of driven sheave 94 causes the rotation of belt 118, which results in the rotation of slave sheave 98. The increased preload in spring 190 causes the gradual counter clockwise rotation of outer bar actuator 70b as indicated by the arrow in FIG. 3. This rotation wraps crank chain 134 around the outer periphery of outer bar actuator 70b and forces crank arm 124 to the left as indicated in phantom in FIG. 3. The rotational preload in coil spring 190 is enough of a force to overcome the counter acting compressive force of coil spring 116 acting on movable disk 112a of slave sheave 98. Movable disk 112 of driven sheave 94 slowly moves to the right, driving belt 118 up drive face 114 of fixed disk 110. Movable disk 112a of slave sheave 98 is, at the same time, moving to the right and compressing coil spring 116. Belt 118 is moving down drive face 114a of movable disc 112a.

Outer cylindrical actuator 70b will continue to rotate in a counterclockwise direction until stop 154 again comes in contact with stop bolt 164. At this point, stop bolt 164 which is affixed to actuator sleeve 70c is held in a fixed position by operator's lever 66 being engaged with the high speed detent in speed quadrant 68. This high speed position of sheave drive 90 is shown in phantom in FIG. 3.

In the previously described operator condition, counterclockwise rotation of operator's lever 66 effectively imposes a greater rotational preload on coil spring 190. This is also true for other two previously described initial operator conditions, although the danger of capturing and tearing belt 118 is not as great since PTO power is rotationally driving the sheave drive 90 when the operator action is taken. This preload acts to gradually rotate outer bar actuator 70b in a counterclockwise direction and to overcome the compressive force exerted by spring 116. Crank arm 124 acts through lever arm 120 to gradually urge movable disk 112 to the right, thereby increasing the effective diameter presented to belt 118 and thereby increasing the speed of sheave drive 90. When decreasing the rotational speed of sheave drive 90, the rotational tension of coil spring 190 is decreased to a point that coil spring 190 is exerting less of a force on sheave drive 90 than spring 116 is. In this case, spring 116 forces movable disc 112a to the left, as depicted in FIG. 3, and thereby changes the configuration of sheave drive 90 to a lower speed configuration, as commanded.

Figure 6:
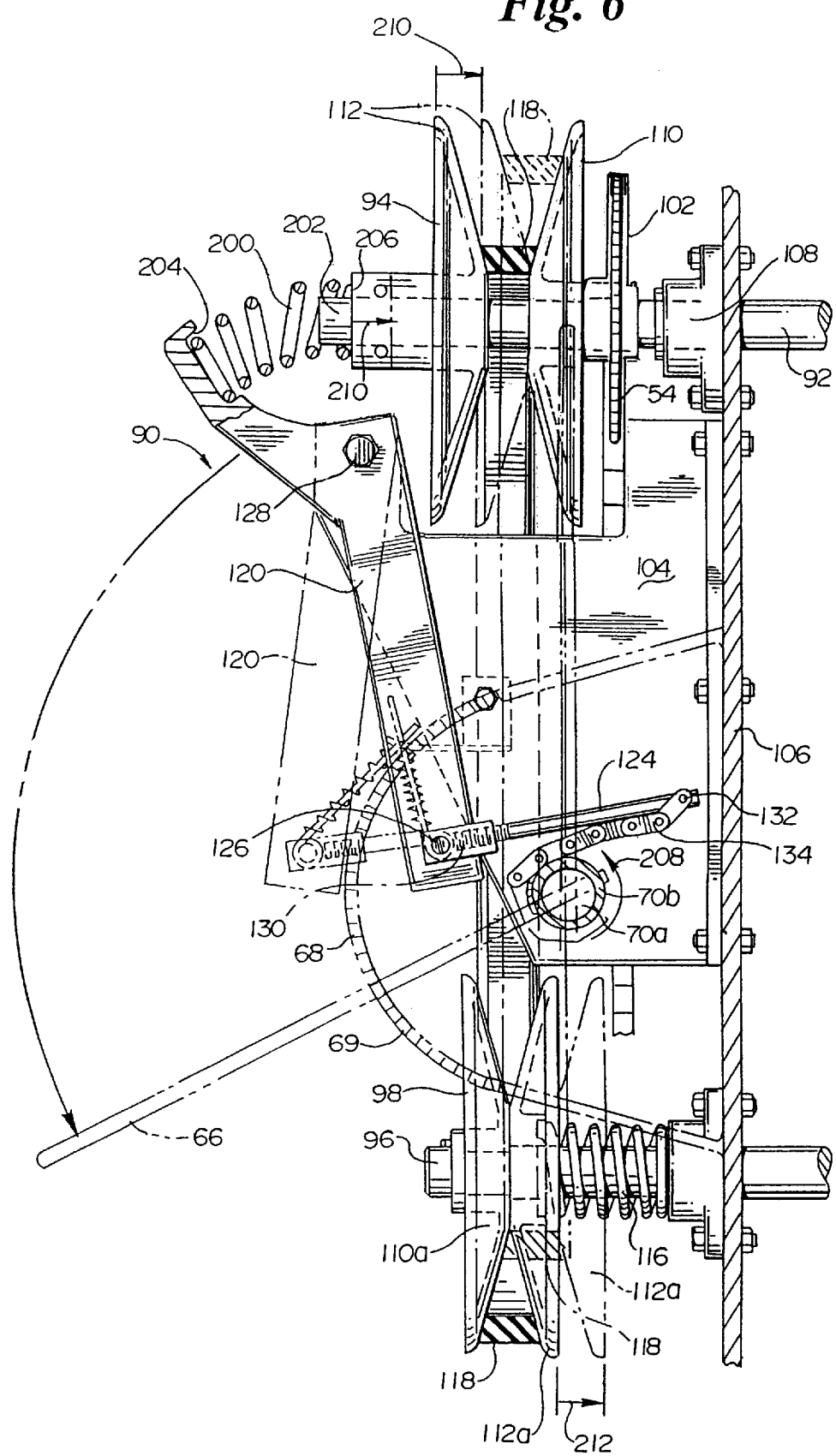
FIG. 6 is a perspective view of an alternative embodiment of the shift mechanism speed selector of the present invention.

FIG. 6 depicts an alternative embodiment to the present invention that is designed to permit an operator to preselect a desired speed range without applying undue pinching pressure on belt 118 that rides within driven sheave 94. The embodiment depicted in FIG. 6 is designed to be used with an inner actuator bar 70a and an outer actuator bar 70b, without the need for spring 190 and its associated connecting apparatus. As depicted, lever arm 120 pivots about pivot joint 128. A coil spring 200 is disposed between cup retainer 204 and hub 206 of movable disk 112. Cup retainer 204 has a cup shaped depression that is sufficiently deep to receive at least one coil of the first end of spring 200. The second end of spring 200 is slipped over stub end 202 of axially shaft 92. Spring 200 bears on hub 206 of movable disk 112. Spring 200 is designed such that in the extended position depicted in solid lines in FIG. 6 spring 200 is maintained in a compressed state, thereby maintaining spring 200 in contact with cup retainer 204 and hub 206.

In operation, sheave drive 90 is in an unpowered state. The operator preselects a speed by moving operator lever 66 to engage a high speed detent 69 in speed quadrant 68. Such motion rotates outer actuator bar 70b as indicated by arrow 208. This rotational motion moves crank arm 124 to the left as depicted in FIG. 6. Lever arm 120 pivots about pivot joint 128 for the compressing spring 200.

Driven sheave 94 is then activated by powering sprocket 102 with drive chain 55. As compressed, spring 200 exerts greater pressure on hub 206 than the opposite pressure that spring 116 exerts on movable disk 112a. Accordingly, as driven sheave 94 commences to rotate, the pressure applied to hub 206 by spring 200 moves movable disk 112 to the right as indicated by arrows 210. This movement forces belt 118 to the high speed position at a relatively greater radial distance from the hub of disk 112, as indicated in phantom. Simultaneously, movable disk 112a is moved to the right as indicated by arrow 212. This action causes belt 118 to drop to the high speed position within slave sheave 96 as indicated in phantom.

Figure 7:
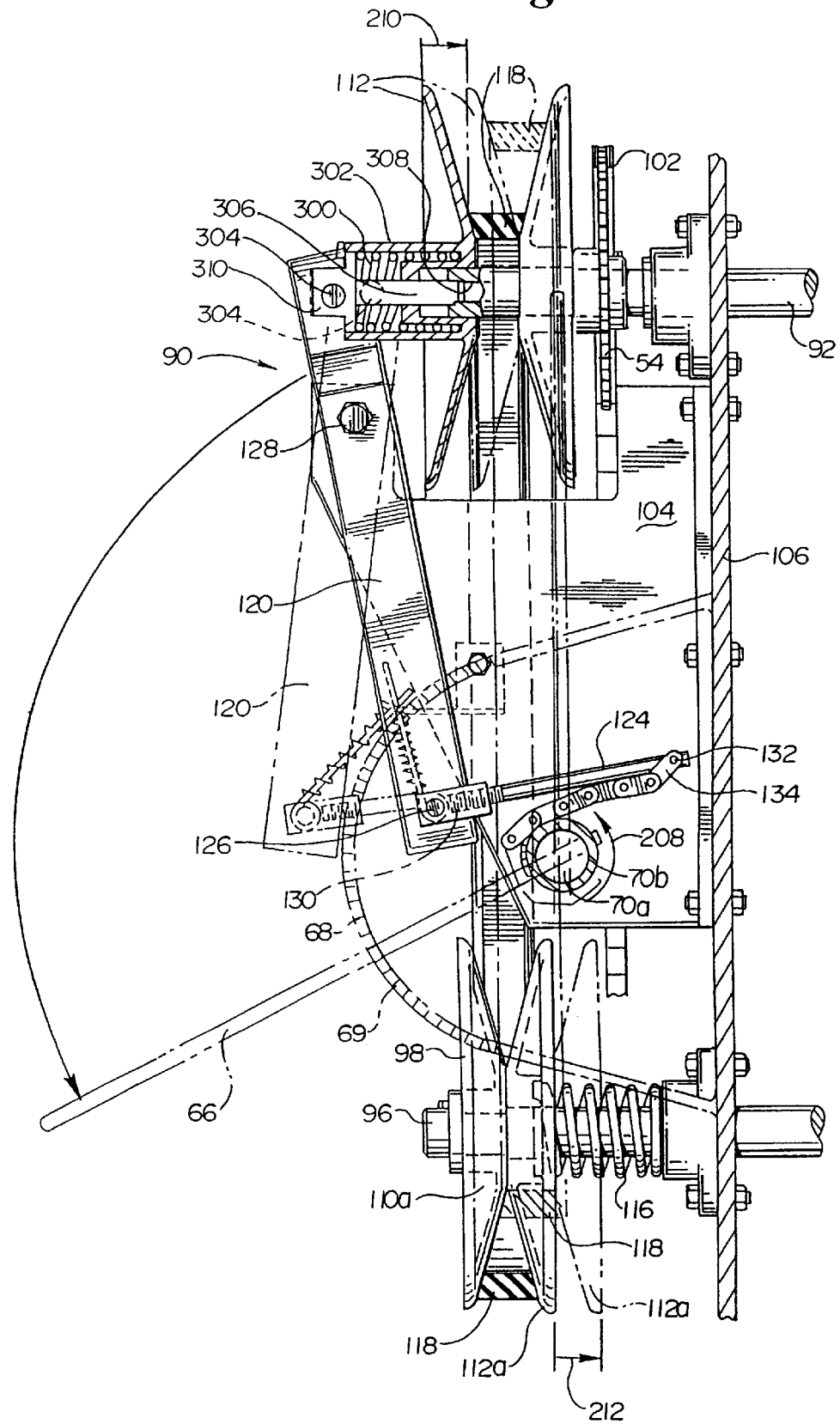
FIG. 7 is a perspective view of a first alternative embodiment of the shift mechanism speed selector of the present invention.

A further embodiment of the present invention is depicted in FIG. 7. A spring 300 is utilized to permit the operator to preselect a desired speed of operation without causing movable disk 112 to unduly pinch belt 118. Spring 300 is mounted within a cavity formed within hub 302 of movable disk 112. Hub 302 is movably coupled to lever arm 120 by pivot pin 304.

Spring 300 is mounted concentric with shaft 306. Shaft 306 is slidably disposed within bore 308 formed in axial shaft 92. End retainer 310 is fixedly coupled to shaft 306. End retainer 310 is free to translate within hub 302 responsive to actuation by lever arm 120.

In operation, the speed preselection by the operator causes lever arm 120 to move to the position indicated in phantom. Such motion causes end retainer 102 to translate to the right as depicted in FIG. 7. Such translation further compresses spring 300, applying a load to movable disk 112. Such load is greater than the opposite load imposed upon movable disk 112a by spring 116. Accordingly, as driven sheave 94 begins to rotate movable disk 112 shifts to the right as indicated by arrow 210 causing belt 118 to move to the previously described high speed position, indicated in phantom. Simultaneously, movable disk 112a of slave sheave 96 also translates to the right as indicated by arrow 212. Such translation causes belt 118 to drop to the previously described high speed position, indicated in phantom.

Figure 8:
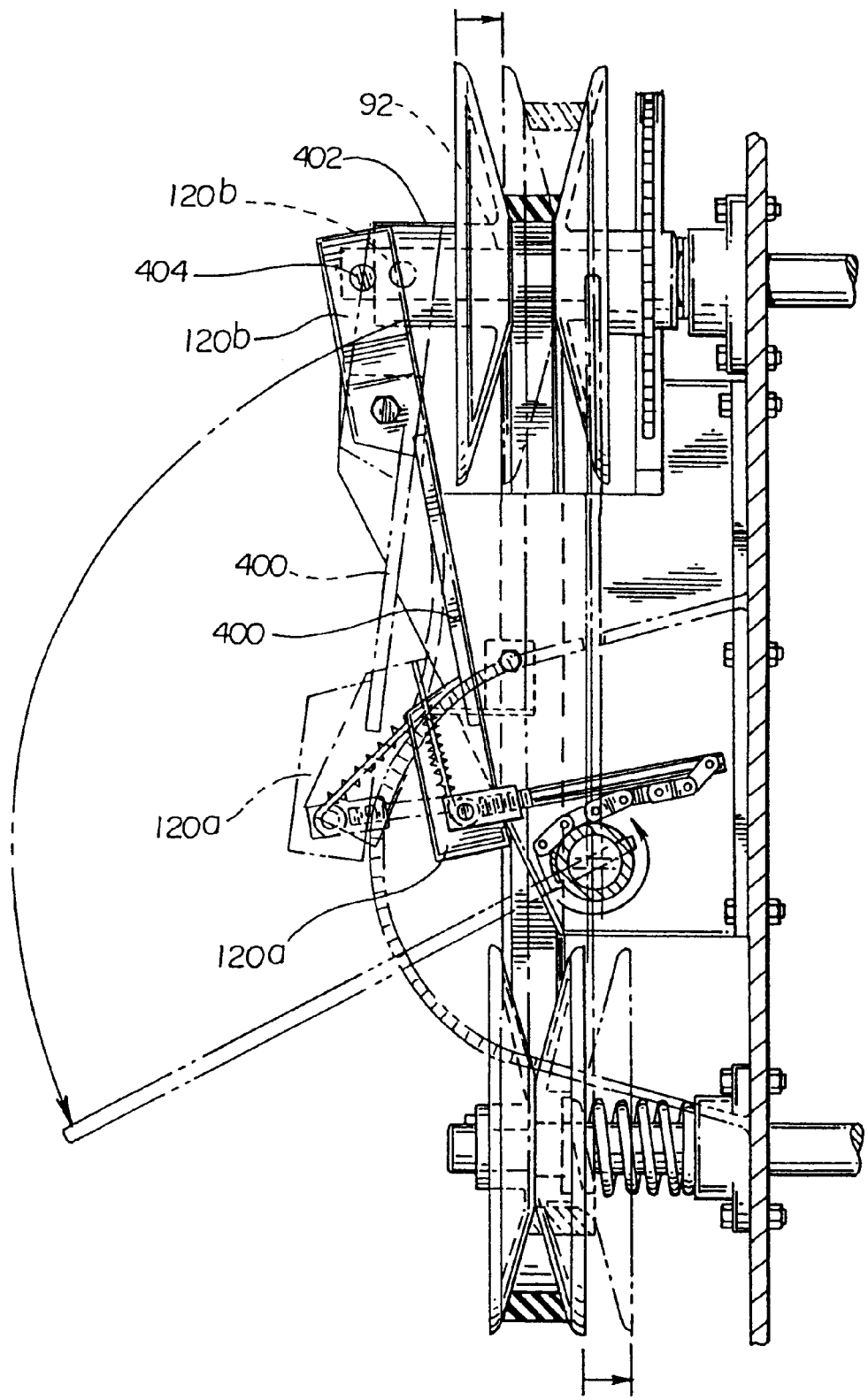
FIG. 8 is a perspective view of a second alternative embodiment of the shift mechanism speed selector of the present invention.

FIG. 8 depicts a further embodiment of the present invention. The embodiment depicted in FIG. 8 replaces the previously described lever arm 120 with a split lever arm having a lower portion 120a and an upper portion 120b joined by a leaf spring 400. The lever arm upper portion 120b is pivotally joined to hub 402 of movable disk 112 by pivot pin 404. Hub 402 is slidably mounted on axial shaft 92 and is free to translate thereon.

In operation, a speed preselection by the operator moves lever arm lower portion 120a to the position indicated in phantom in FIG. 8. Such motion acts to bend leaf spring 400 and increases the tension in leaf spring 400. Leaf spring 400 transmits the increased tension to the lever arm upper portion 120b. The tension caused by leaf spring 400 is transmitted via pivot pin 404 to hub 402. The pressure exerted on hub 402 by leaf spring 400 is greater than the pressure exerted by spring 116 on movable disk 112a. Accordingly, as driven sheave 94 commences rotation, the pressure exerted by leaf spring 400 will cause belt 118, riding in driven sheave 94, to shift to the high speed position as previously indicated.

Figure 9:
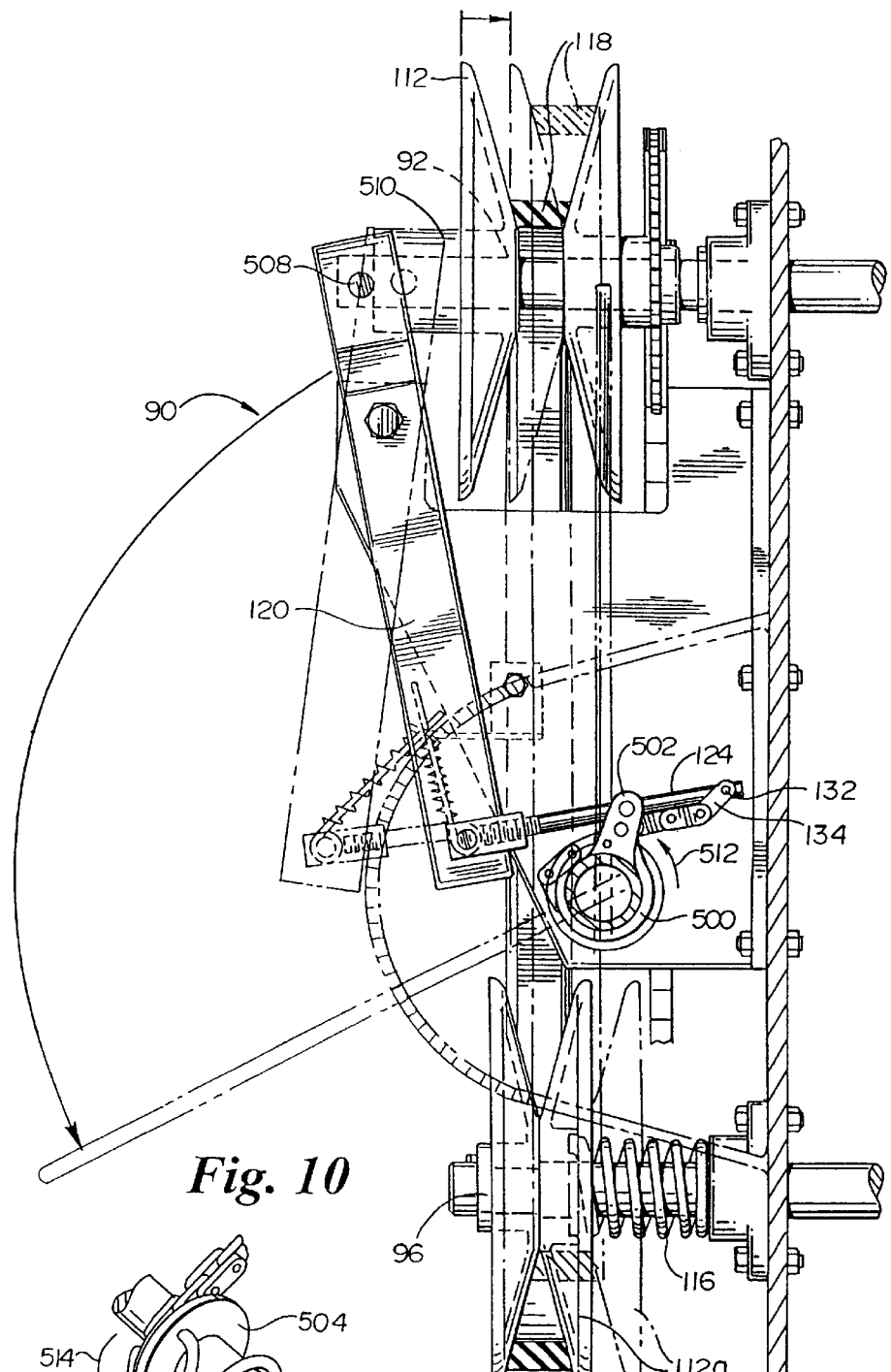
FIG. 9 is a perspective view of a third alternative embodiment of the shift mechanism speed selector of the present invention.
Figure 10:
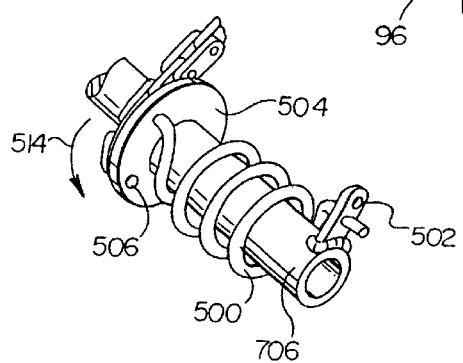
FIG. 10 is a perspective view of a fourth alternative embodiment of the shift mechanism speed selector of the present invention.

FIGS. 9 and 10 depict a further embodiment of the present invention. A coil spring 500 is mounted concentric with outer actuator bar 70b. A first end of spring 500 is retained in a bore formed in tab 502. Tab 502 is affixed as by weldments to the exterior surface of outer actuator bar 70b. The second end of spring 500 is retained in a bore formed in sprocket 504.

Sprocket 504 is mounted concentric with outer actuator bar 70b and is free to rotate there about. Sprocket 504 includes a race for winding crank chain 134 thereon. A first end of crank 134 is affixed to sprocket 504 by link pin 506.

Referring to FIG. 9, lever arm 120 is affixed by pivot pin 508 to hub 510 of movable disk 112. Hub 510 is slidably engaged with axially shaft 92 and is free to translate thereon.

In operation, the operator makes a preselection of a high speed mode of operation. Such preselection rotates outer bar actuator 70b as indicated by arrow 512. This rotation rotates tab 502 which increases the tension in spring 500. At this point, there is no apparent motion of lever arm 120.

As driven sheave 94 commences rotation, the increased tension in spring 500 overcomes the counter tension imposed by spring 116 on driven sheave 94, causing sprocket 504 to rotate as indicated by arrow 514. Such motion causes crank chain 134 to wrap around sprocket 504, moving crank arm 124 and lever arm 120 to the left as depicted in phantom. Such motion results in belt 118 moving to the high speed position as previously described.

Figure 11:
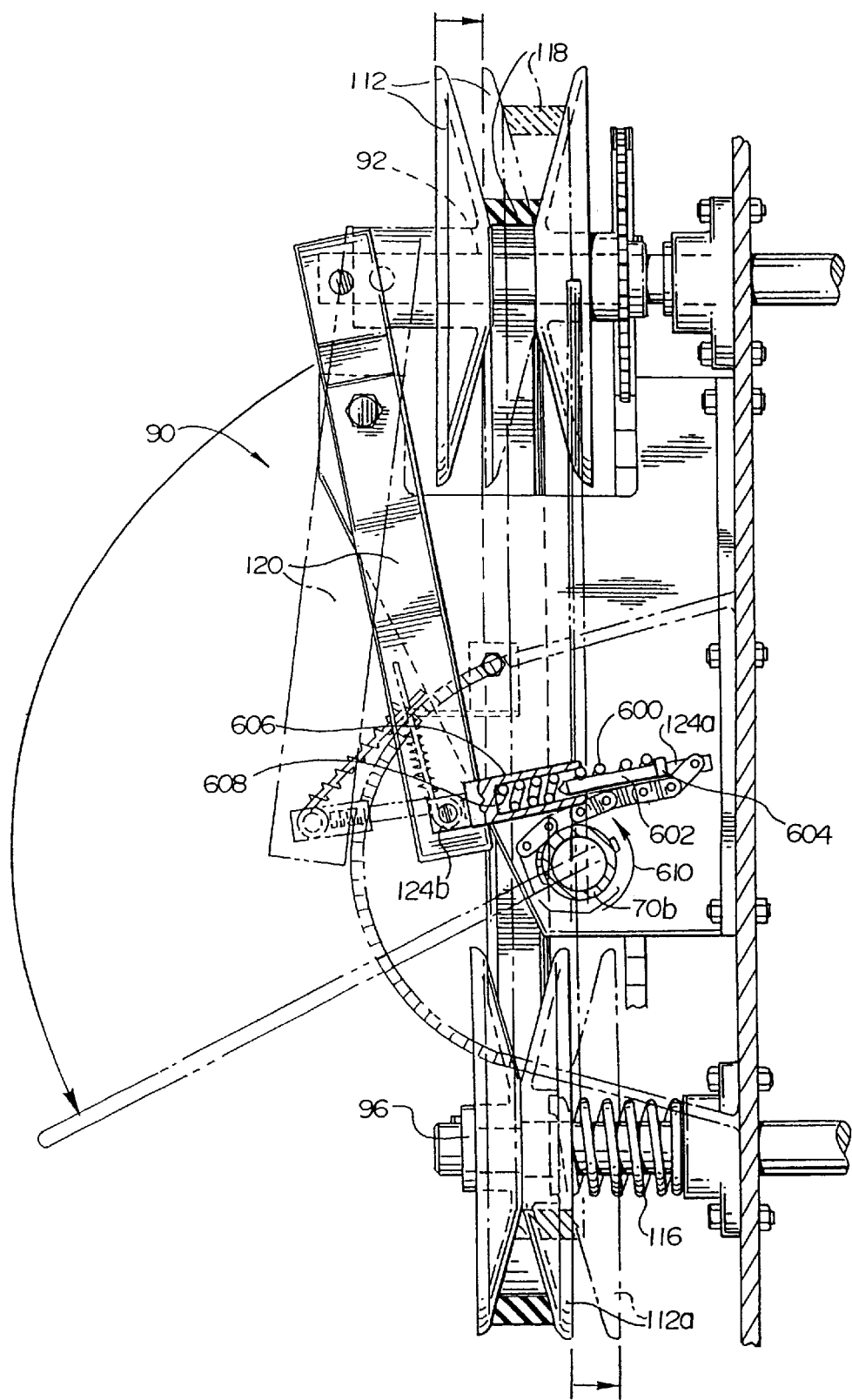
FIG. 11 is a perspective view of a fifth alternative embodiment of the shift mechanism speed selector of the present invention.

A further embodiment of the present invention is depicted in FIG. 11. The embodiment of FIG. 11 replaces the previously described crank arm 124 with a crank arm having a first end 124a and a second end 124b. A spring 600 is disposed between crank arm first end 124a and crank arm second end 124b. Spring 600 is preferably a coil spring and is mounted at a first end concentric with shaft 602. Shaft 602 is fixedly coupled to crank arm first end 124a. Shaft 602 preferably has a tapered first end that is directed along the center line of spring 600. A cylindrical retainer 604 is disposed between shaft 602 and crank arm first end 124a. The first end of spring 600 bears upon retainer 604.

A cylindrical sleeve 606 is coupled to crank arm second end 124b. Sleeve 606 is designed to receive a portion of spring 600 therein. The second end of spring 600 bears upon end face 608 of sleeve 606. Shaft 602 and cylindrical sleeve 606 are designed to overlap somewhat in order to ensure that spring 600 is retained therein.

In operation, rotation of actuator shaft 70b as indicated by arrow 610 forces crank arm first end 124a to the left as depicted in FIG. 11. This action compresses spring 600 between cylindrical retainer 604 and end face 608 of sleeve 606. The spring 600 then enacts to urge crank arm second end 124b to the left as indicated in phantom. Lever arm 120 acts to displace the movable disc 112 to the right and to move the belt to the previously described high speed position.

The clutch of the present invention is shown generally at 54 in FIGS. 1, 2 and 12–20. FIGS. 1 and 2 depict the clutch 54 as typically employed on a forage box 10. It is understood that clutch 54 may be used in a wide variety of applications for coupling a prime mover to a driven mechanism. Clutch 54 is comprised of six major assemblies: clutch mount assembly 712, driving sheave assembly 714, driven sheave assembly 716, idler-stop assembly 718, actuator assembly 720, and emergency stop assembly 724.

As depicted in FIGS. 1 and 2, the clutch 54 is mounted on the front facing side of a forage box 10. The unloading mechanisms of the forage box 710 are powered by the power take off of the tractor 50. Controls for the PTO are typically in the cab of the tractor 50 and, once the PTO is engaged, disengagement of the PTO is effected only by reentering the cab.

Figure 12:
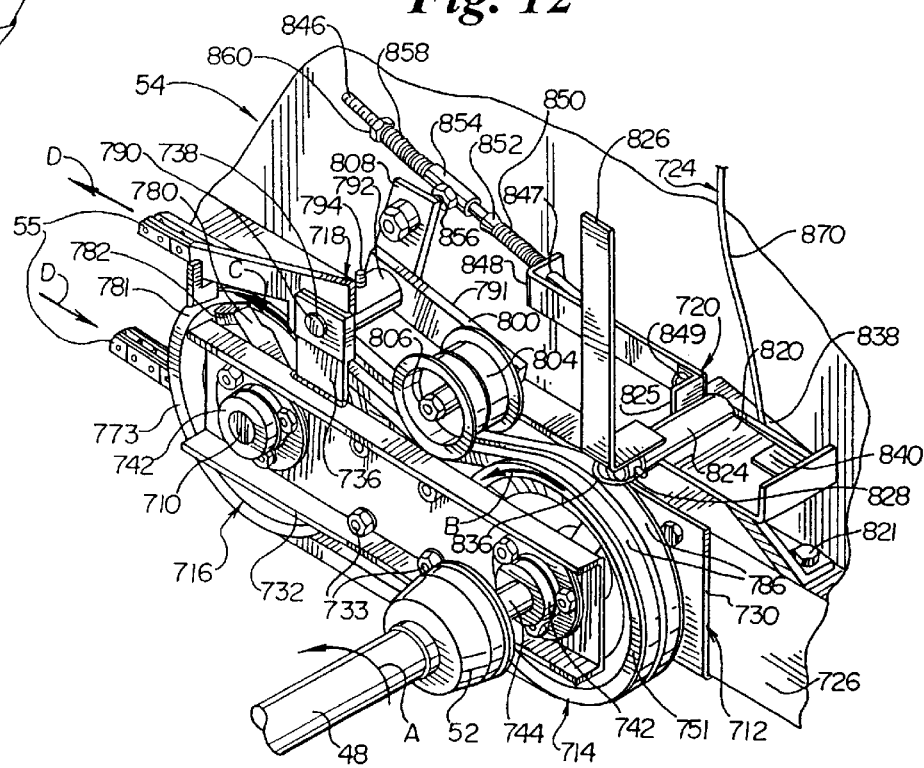
FIG. 12 is a fragmentary, perspective view of the clutch of the present invention with the clutch in the engaged mode.

The clutch mount assembly 712 of the clutch 54 is best depicted in FIGS. 12–14 and 20. The clutch mount assembly 712 has a clutch mount 730 that is bolted to the frame of the forage box 10. The front clutch plate 732, depicted in FIGS. 12 and 20, is mounted by bolts 733 to a plate mounting tower 734, depicted in FIGS. 13, 14 and 20.

The plate mounting tower 734 is preferably welded to clutch mount 730. A first idler mounting bar 735 is preferably welded to plate mounting tower 734 and projects upward therefrom. A bore 737 is defined in the upward directed end of the first idler mounting bar 735. Two bearing bores 739 are defined in the clutch mount 730 for mounting bearings 741 that support the driving sheave assembly 714 and driven sheave assembly 716. The bearings 741 are held in place by nuts and bolts 743.

A second idler mounting bar 736 is welded to the front clutch plate 732 as depicted in FIGS. 12 and 20. The second idler bar 736 has a bore 738 defined therein. The second idler mounting bar 732 and bore 738 are in registry with the first idler bar 735 and bore 737 defined therein. The front clutch plate 732 has two bearing bores 740 defined therein that are in registry with bearing bores 739 of the clutch mount 730. Bearings 742 that support the driving sheave assembly 714 and driven sheave assembly 716 are disposed in the bearing bores 740. The bearings 742 are held in place by nuts and bolts 743. The front clutch plate 732 is coupled to the plate mounting tower 734 of the clutch mount 730 by mounting nuts 733.

The driving sheave assembly 714 of the clutch 54 is best depicted in FIGS. 12–14 and 20. The driving sheave assembly 714 has a rotatable shaft 744. The shaft 744 is coupled by a Woodruff key 745 to universal joint 52 to the PTO drive shaft 48 that extends between the forage box 10 and the tractor 50. The shaft 744 is rotationally borne in bearings 741 and 742 mounted in the bearing bore 740 of the front clutch plate 732 and mounted in the bearing bore 739 of the clutch mount 730.

The sheave 751 is mounted on the shaft 744. The sheave 751 has a hub 752. The hub 752 is fixedly coupled to the shaft 744 by a Woodruff key 753 interposed between the Woodruff key groove 758 and a similar such groove 758 defined in the shaft 744. Additionally, set screws 760 hold the hub 752 of the sheave 751 to the shaft 744. The hub 752 is coupled to rim 763 by spokes 762. Two belt tracks 764 are defined in the outer face of the rim 763.

The driven sheave assembly 716 is best depicted in FIGS. 12–14, 16 and 20. The driven sheave assembly 716 has a rotatable shaft 770 borne in bearings 741 and 742. A sheave 773 has a hub 774. The sheave 773 is fixedly coupled to the shaft 770 by a Woodruff key 775 borne in a Woodruff key groove 776 and a like groove 776 formed in the shaft 770. Set screws 778 assist in fixedly coupling the sheave 773 to the shaft 770. Spokes 780 support a rim 781. Significantly, one of the spokes 780 has a stop 782 that is preferably formed integral therewith and that projects outside of the plane of revolution of the rim 781. The stop 782 rotates with the sheave 773, but in a plane of revolution that is parallel to and spaced apart from that of the rim 781. A pair of belt tracks 784 are defined in the rim 781. Two belts 786 ride in the belt tracks 784 of the sheave 773 and the belt tracks 764 of sheave 751.

A toothed sprocket 787, depicted on FIG. 20, preferably has a diameter somewhat less than the diameter of the sheave 773. The toothed sprocket 787 is carried on the shaft 770 and positioned between the sheave 773 and the clutch mount 730. The toothed sprocket 787 is affixed rotationally to the shaft 770 preferably by both a Woodruff key 785 and a set screws 789. The toothed sprocket 787 rotates with the shaft 770 and the sheave 773. The drive chain 55 is passed over the toothed sprocket and driven thereby. The drive chain 55 is coupled to the transmission 46 of the forage box 10, as depicted in FIGS. 1 and 2.

The idler-stop assembly 718 is depicted in FIGS. 12–14, 17 and 20. The idler-stop assembly 718 has a shaft 790 that is rotationally borne in the bore 738 of the second idler mounting bar 736 coupled to the front clutch plate 732 and the bore 737 in the first idler mounting bar 735 welded to the plate mounting tower 734, as depicted in FIGS. 12 and 20. The idler-stop bracket 791 is fixedly carried on the shaft 790. The bushing 792 of the bracket 791 has the shaft 790 inserted therein. The bushing 792 rotates about the shaft 790, the interface therebetween being lubricated by grease injected through grease fitting 794.

The bracket 791 has three links attached to the bushing 792. The first such link is the stop link 796. The stop link 796 has a stop plate 798 preferably welded proximate its distal end. The stop plate 798 is disposed generally orthogonally with respect to the longitudinal axis of the stop link 796.

The second link of the bracket 791 is the pulley link 800 and has a pulley bore 802 defined proximate the distal end thereof. A pulley 804 is rotationally mounted on a pulley shaft 806 secured in the pulley bore 802 by nut 807.

The third link of the bracket 791 is the actuator rod link 808. The actuator rod link 808 has a bore 810 disposed proximate its distal end.

Figure 13:
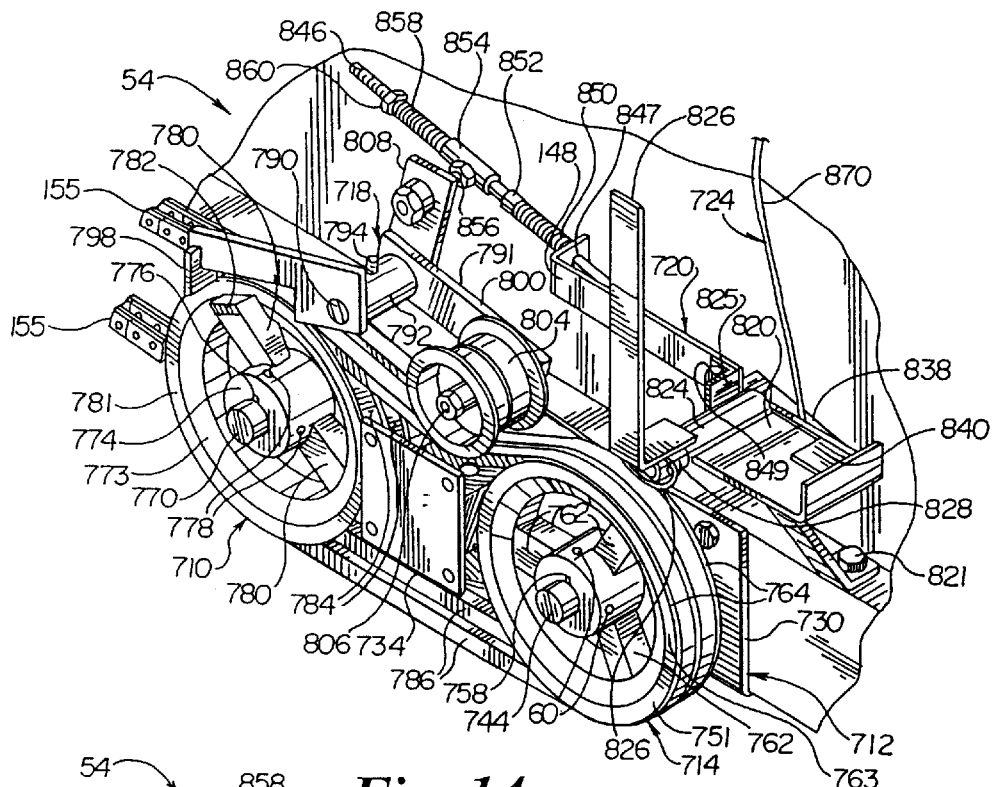
FIG. 13 is a fragmentary, perspective view of the clutch of the present invention in the engaged mode of operation with the front clutch plate removed.
Figure 14:
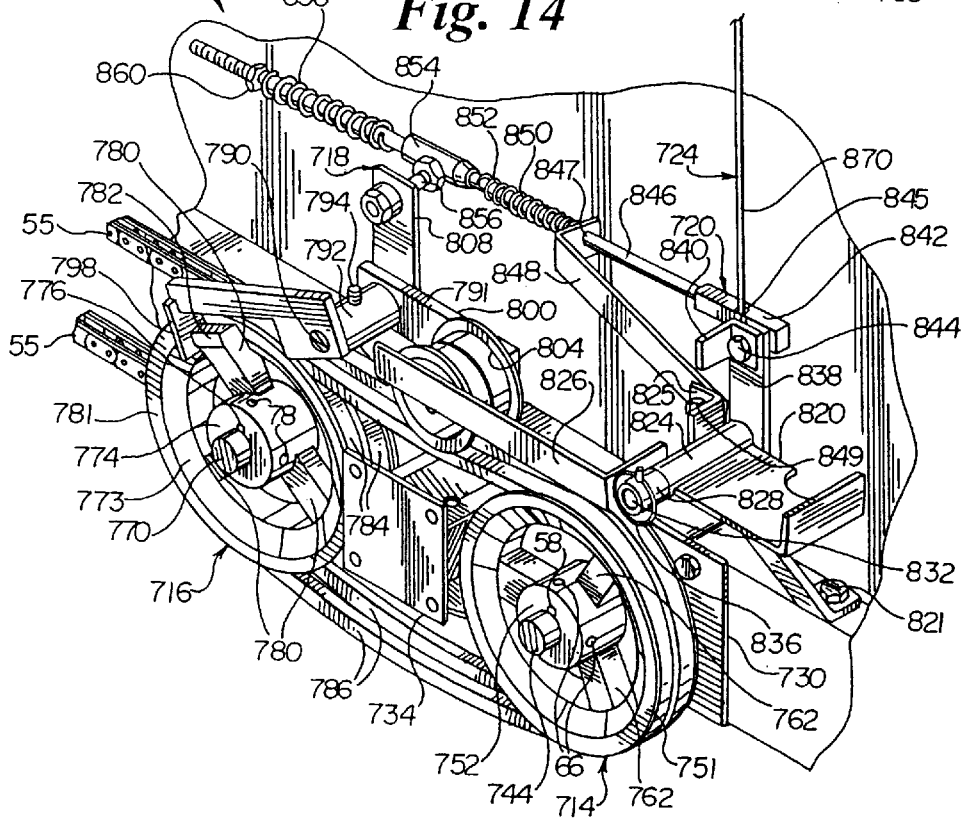
FIG. 14 is a fragmentary, perspective view of the clutch as depicted in FIG. 13 in the disengaged mode of operation.
Figure 16:
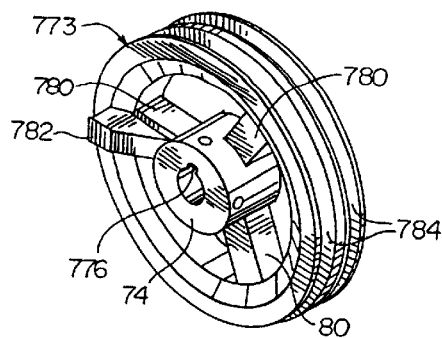
FIG. 16 is a perspective view of the driven sheave with the positive stop.
Figure 15:
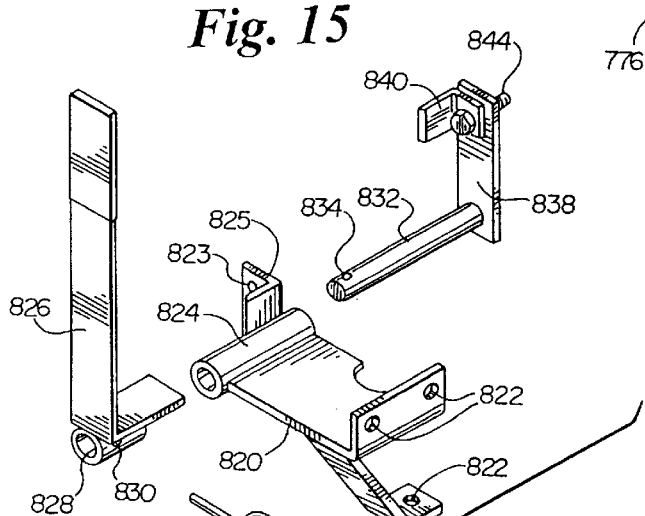
FIG. 15 is an exploded perspective view of the actuator assembly.
Figure 17:
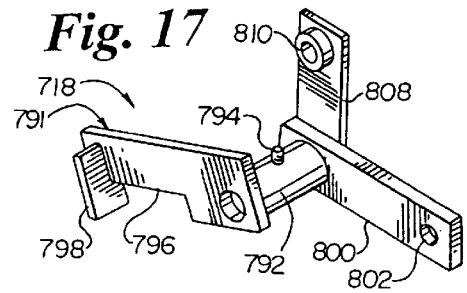
FIG. 17 is a perspective view of the idler-stop assembly.
Figure 18:
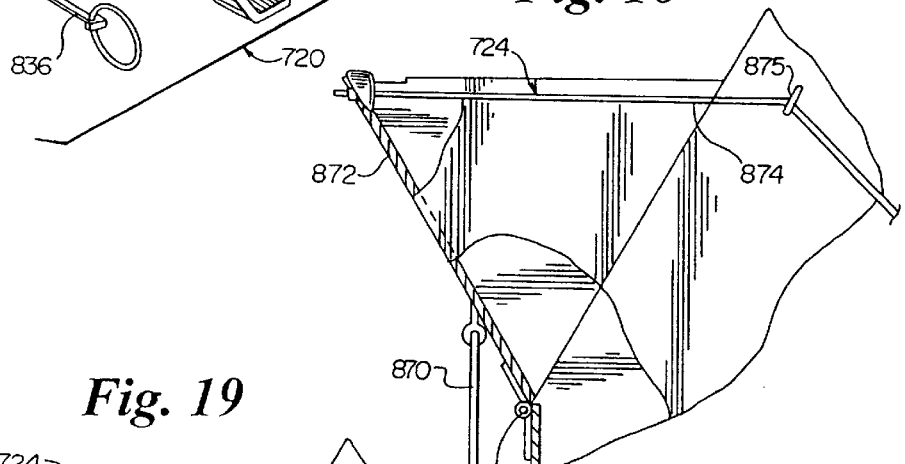
FIG. 18 is a side elevational view of the emergency stop mechanism shown at 18 of the FIG. 1.

The actuator assembly 720 is best depicted in FIGS. 12–15 and 20. The actuator assembly 720 has an actuator mount 820. The actuator mount 820 is fixedly coupled to the forage box 10 by bolts 821 passed through the bores 822. The actuator mount 820 has a brace bore 823 defined in a piece of angle iron 825 welded to the actuator mount 820, as depicted in FIGS. 15 and 20. A sleeve 824 is formed as a portion of the actuator mount 820.

An actuator handle 826 has a handle sleeve 828 welded to an end thereof. A pin bore 830 is defined through the handle sleeve 828. A preferably plastic grip 833 may be disposed on the actuator handle 826.

An actuator shaft 832 is rotationally borne in the sleeve 824 and is fixedly coupled to the handle sleeve 828 by a lynch pin 836 that is passed through the pin bore 830 and a pin bore 834 formed the actuator shaft 832 that is brought into registry with the pin bore 830.

An arm 838 is fixedly coupled to the actuator shaft 832 at the opposite end thereof from the actuator handle 826. The arm 838 has an over travel stop 840 fixedly coupled to the distal end of the arm 838. An actuator rod end 842, depicted in FIGS. 14 and 20, is also coupled to the distal end of the arm 838 and held in place by the same nut and bolt 844 that holds the over travel stop 840 in place.

The actuator rod end 842 has a longitudinal threaded bore (not shown) defined in an end thereof and a transverse cable bore 845 defined therethrough. An actuator rod 846 is threadedly coupled to the actuator rod end 842 by means of the longitudinal threaded bore defined therein and lock nut 847.

The actuator rod 846 is slidably supported in a bore 847 formed in a first end of a pivoting brace 848. The pivoting brace 848 is pivotally coupled to the actuator mount 820 by nut and bolt 849 through the brace bore 823 and the bore 851 defined in the pivoting brace 848.

The pivoting brace 848 acts as a first spring stop for the disengage spring 850. The disengage spring 850 is a coil spring concentrically mounted on the actuator rod 846. A second spring stop 852 is formed integral with the actuator rod 846 on the other side of the disengage spring 850 from the pivoting brace 848.

The actuator rod 846 slidably passes through the aperture 853 longitudinally defined in the rod slide 854. The rod slide 854 has a transverse slide bolt 856 that is fixedly borne in bore 810 of the actuator rod link 808. A coil engage spring 858 is positioned concentrically on the actuator rod 846 and is maintained in position between the rod slide 854 and a lock nut 860.

The emergency stop assembly 724 of the clutch 54 is depicted in FIGS. 1, 2, 18, 19, and 20. A primary emergency cable 870 is passed through the cable guide 869, which is disposed in the bore 845 of the actuator rod end 842. The primary emergency cable 870 clamped in place by clamp 867. The primary emergency cable 870 is carried up the front face of the forage box 10, guided by cable guide 871 and is affixed to hinged guard 872 by U-bolt 873. The hinged guard 872 is shiftably coupled to the front face of the forage box 10 by the hinge 877.

A secondary emergency cable 874 has a first end fixedly coupled to the upper margin of the hinged guard 872 at the left hand side thereof. The secondary emergency cable 174 is routed through the screw eye 175 and downward to a position behind the discharge opening 41 of the forage box 10. At such point, the secondary emergency cable 874 is fixedly coupled to the forage box 10.

Prior to operation, the clutch 54 is typically in a disengaged configuration as indicated in FIG. 14. The disengage spring 850 is preferably compressed and is exerting a force on the spring stop 852. The engage spring 858 is uncompressed and so is not biasing the pulley 804 into contact with the belts 786. This results in the pulley 804 merely resting on the two belts 786 and not exerting any downward pressure thereon. Additionally, the stop plate 798 is engaged with the stop 782, thereby preventing the sheave 773 from rotating. As indicated in FIG. 14, the belts 786 are in a slack condition.

At this point, rotation of the PTO drive shaft 48 is commenced by actuating controls at the tractor 50. The PTO drive shaft 48 rotates in a counterclockwise direction as indicated by the arrow A in FIG. 12. The PTO drive shaft 48 is directly coupled to the driving sheave assembly 714. Accordingly, sheave 751 rotates with the PTO drive shaft 48, as indicated by arrow B. No other rotation of any components of the clutch 54 is taking place at this point.

To engage the clutch 54, the operator rotates the handle 826 from the generally horizontal position depicted in FIG. 14 to the generally vertical position indicated in FIGS. 1–2, 12, and 13. Such rotation causes the actuator rod 846 to translate to the right and downward as depicted in FIGS. 12 and 13. The rotation compresses both the disengage spring 850 and the engage spring 858. The disengage spring 850 is compressed between the pivoting brace 848 and the spring stop 852. The engage spring 858 is compressed between rod slide 854 and the lock nut 860.

As the handle 826 is rotated to the vertical position, the actuator rod 846 passes through a point defined by an extension of the center line of the actuator shaft 832, which is an on-center position, and goes into an over center condition, as depicted in FIGS. 12 and 13. Rotation to the over center position is stopped when the over travel stop 840 bears upon the actuator mount 820, also as depicted in FIGS. 12 and 13.

The rotation of the handle 826 results in clockwise rotation of the idler-stop assembly 718. This rotation causes the pulley 804 to exert downward pressure on the belts 786, tightening the belts 786 in the belt tracks 764, 784. The angle between the pulley link 800 and the stop link 796 is such that when the pulley 804 is rotated far enough to tension the belts 786, stop plate 798 has been rotated out of engagement with the stop 782. Accordingly, the stop link 796 is raised freeing the stop plate 798 from engagement with the stop 782. Such disengagement frees the sheave 773 to rotate. As the belts 786 tighten, the driven sheave assembly 716 commences to rotate in a counterclockwise direction, as indicated by arrow C. Such rotation imparts the translational motion to the drive chain 55 as indicated in FIG. 12 by arrows D.

Under heavy load, the belts 786 typically stretch. To accommodate for the stretching, the compressed engage spring 858 continues to bear upon the rod slide 854, increasing the amount of rotation of the idler-stop assembly 718. This rotation to accommodate belt stretch is limited at the point at which the rod slide 854 comes into contact with the spring stop 852 on the actuator rod 846.

Referring to FIGS. 1 and 2, the translational motion of the drive chain 55 provides power to the transmission 46. The transmission 46 is so mechanized that the cross conveyor, in this case twin augers 42, is directly coupled to the drive chain 55. Accordingly, as soon as the clutch 54 is engaged, the cross conveyor 42 begins operation and product is unloaded through the discharge opening 41. Further control of the transmission 46 is provided by the operator's lever 66 of the shift assembly 64. Momentary movement of the operator's lever 66 to the right as depicted in FIG. 1 results in actuation of the beaters 40 for as long as the operator's lever 66 is held to the right. Rotation of the beaters 40 causes product contained within the forage box 10 to fall onto the cross conveyor 42 and be unloaded from the forage box 10.

For sustained unloading of the forage box 10, the operator's lever 66 is moved to the right to engage the beaters 40 and then is rotated forward and downward to engage an indent 69 in the speed quadrant 68 to select one of twelve speeds for the movable apron (not shown) that operates on the bed of the forage box 10.

To disengage the clutch 54, the operator rotates the actuator handle 826 from the substantially vertical position indicated in FIGS. 1, 2 and 12–13 to the substantially horizontal position indicated in FIG. 14. Once the actuator rod 846 passes the extension of the center line of the actuator shaft 832 the clutch 54 is out of the over center condition and the handle 826 can be released. The compressed disengage spring 850 acting on the stop 852 will then return the idle-stop assembly 718 to the disengaged condition as indicated in FIG. 14. The rotation of the idler-stop assembly 718 places the stop plate 798 of the stop link 796 into the path of the rotating stop 782. As the stop 782 comes into engagement with the stop plate 798, rotation of the sheave 773 and the driven sheave assembly 716 ceases. The rotation of the driven sheave assembly 716 positively ceases upon such engagement even though the belts 786 may still be firmly engaged in the belt tracks 784 as caused by rust in the belt tracks 784, the use of belt dressing to increase the friction of the belts 786 or the clutch 54 having been under heavy load.

The cessation of rotation of the driven sheave assembly 716 positively stops the translational motion of the drive chain 55 and positively stops the actuation of the cross conveyor 42, the beaters 40, and aprons, without regard to the position of the operator's lever 66. The operator's lever 66 may still be in the engaged position in a detent 69. At this point, the driving sheave assembly 714 is still being rotational driven by the PTO drive shaft 48, as indicated by arrows A,B.

To perform an emergency stop of the cross conveyor 42, the beaters 40 and the aprons, the primary emergency cable 870 need only be raised far enough to bring the actuator rod 846 out of the over center condition and past the on-center point. Once past the on-center point, the disengage spring 850 acts to fully disengage the clutch 54 and to positively stop the driven sheave assembly 716, as previously described.

Figure 19:
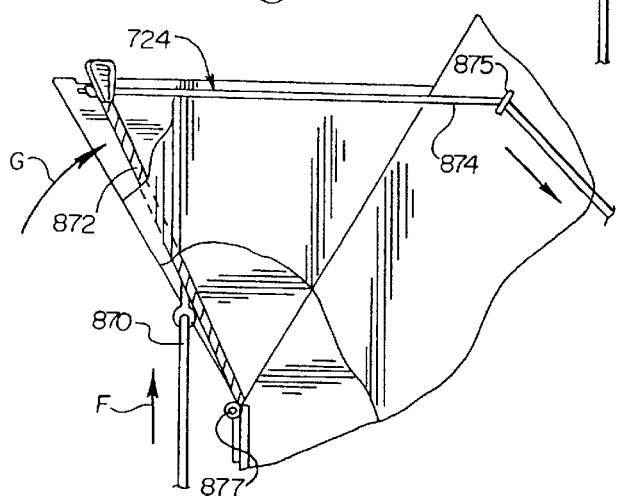
FIG. 19 is a side elevational view of the emergency stop assembly of FIG. 18 in the activated mode.

To initiate the emergency stop, the primary emergency cable 870 can be simply pulled on to raise the actuator rod 846 above the over center position, as indicted by arrow F in FIG. 19. Further, simply pushing on the hinged guard 872 to rotate the hinged guard into the forage box 10 accomplishes the raising action on the actuator rod 846, as indicated by arrows F and G in FIG. 19.

If the operator is standing proximate the discharge opening 41 and desires to effect an emergency stop, the operator need only pull on the secondary emergency cable 874. Such action acts to rotate the hinged guard 872 inward, exerting a tensional force on the primary emergency cable 870 sufficient to pull the actuator rod 846 out of the over center condition and past the on-center point, as indicated by arrows F and G in FIG. 19.

It is understood that a number of modifications can be readily devised in accordance with the principles of the present invention by those skilled in the art without departing from the spirit and scope of the invention. Therefore, it is not desired to restrict the invention to the particular construction illustrated and described, but to cover all modifications that may fall within the scope of the appended claims.

We claim:

1. A power control system for controlling power from a power source to a transmission, comprising:

in combination, a manually actuatable shift assembly having at least first and second actuators for selectively, variably controlling the transmission for effecting the distribution of power to at least respective first and second driven mechanisms;

the shift assembly effecting a rotational motion transmitted to the first driven mechanism being independent of the rotational motion transmitted to the second driven mechanism;

the first and second actuators having respective first and a second independent linkages, the first linkage effecting the rotational motion transmitted to the first driven mechanism and the second linkage effecting the rotational motion transmitted to the second driven mechanism; and a clutch having a stop engaging member, the stop engaging member positively disengaging the transmission from the power source when the clutch is in a disengaged disposition.

2. A power control system for controlling power from a power source to a transmission, comprising:

in combination, a manually actuatable shift assembly having at least first and second actuators for selectively, variably controlling the transmission for effecting the distribution of power to at least respective first and second driven mechanisms;

the shift assembly having a biasing member, the biasing member effecting a variable, selectable, preloaded speed selection on the transmission prior to the distribution of power to the transmission;

the variable, selectable, preloaded speed selection on the transmission causing the transmission to shift to the speed selection after the distribution of power to the transmission; and a clutch having a stop engaging member, the stop engaging member positively disengaging the transmission from the power source when the clutch is in a disengaged disposition.

3. The power control system of claim 2, the second actuator being shiftable while power is distributed to the transmission for effecting speed changes to the second driven mechanism.

4. The power control system of claim 3, wherein shifting the second actuator while power is being distributed to the transmission for effecting speed changes to the second driven mechanism does not affect power transmitted to the first driven mechanism.

* * * * *